(12) United States Patent
Smith et al.

(10) Patent No.: US 11,708,182 B2
(45) Date of Patent: Jul. 25, 2023

(54) ELECTROSPRAY DEVICES AND METHODS FOR FABRICATING ELECTROSPRAY DEVICES

(71) Applicant: Massachusetts Institute of Technology, Cambridge, MA (US)

(72) Inventors: Melissa Alyson Smith, Cambridge, MA (US); Donna-Ruth Yost, Acton, MA (US); Daniel Freeman, Reading, MA (US); Noah Siegel, Las Vegas, NV (US); Paulo C. Lozano, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 65 days.

(21) Appl. No.: 17/007,890

(22) Filed: Aug. 31, 2020

(65) Prior Publication Data
US 2022/0068623 A1  Mar. 3, 2022

(51) Int. Cl.
*B64G 1/40* (2006.01)
*F03H 1/00* (2006.01)
*H01J 49/16* (2006.01)

(52) U.S. Cl.
CPC .......... *B64G 1/405* (2013.01); *F03H 1/0012* (2013.01); *H01J 49/165* (2013.01)

(58) Field of Classification Search
CPC ........ F03H 1/005; F03H 1/0012; B64G 1/405
See application file for complete search history.

(56) References Cited

U.S. PATENT DOCUMENTS

2020/0373141 A1*  11/2020  Perna ................... H01J 49/168

OTHER PUBLICATIONS

Gassend "A microfabricated planar electrospray array ionic liquid ion source with integrated extractor" (Year: 2009).*
Smith et al., Design, simulation, and fabrication of three-dimensional microsystem components using grayscale photolithography. J Micro/Nanolithography, MEMS, and MOEMS. 2019;18(4):043507.

* cited by examiner

*Primary Examiner* — Arun Goyal
*Assistant Examiner* — William L Breazeal
(74) *Attorney, Agent, or Firm* — Wolf, Greenfield & Sacks, P.C.

(57) ABSTRACT

Electrospray devices and methods of fabricating electrospray devices are described.

26 Claims, 15 Drawing Sheets

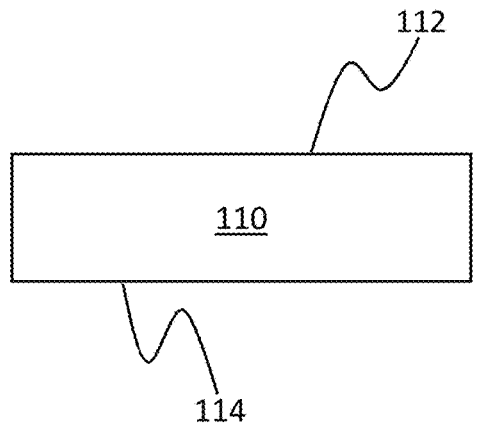
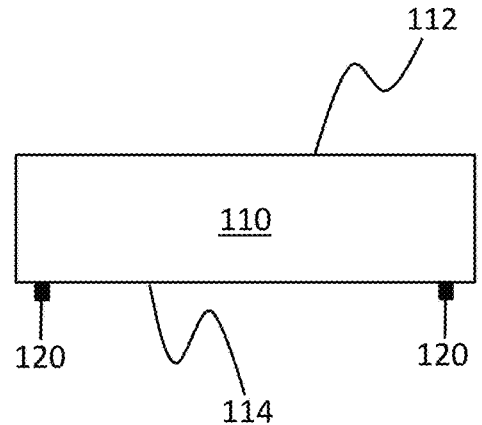
FIG. 1A
FIG. 1B
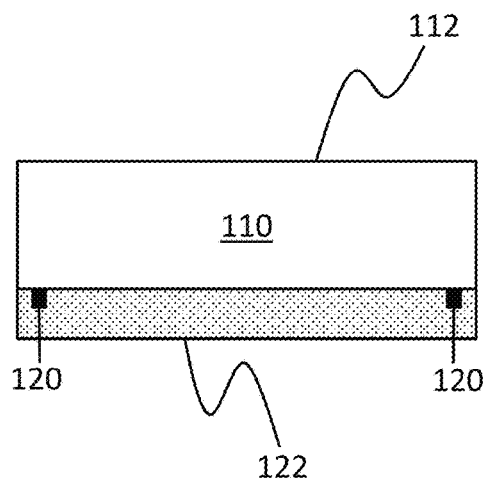
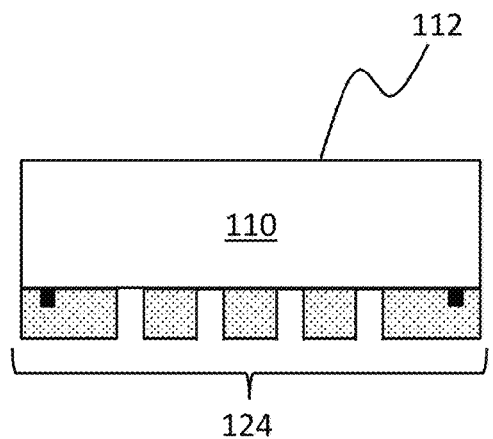
FIG. 1C
FIG. 1D

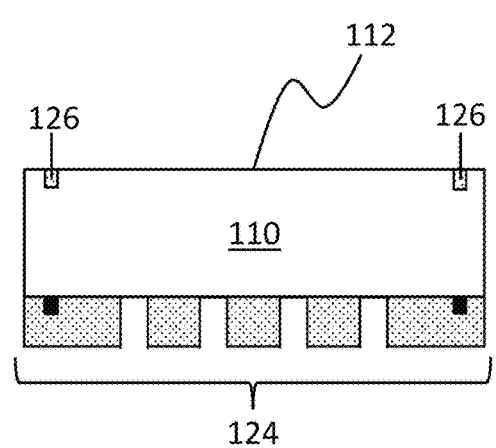
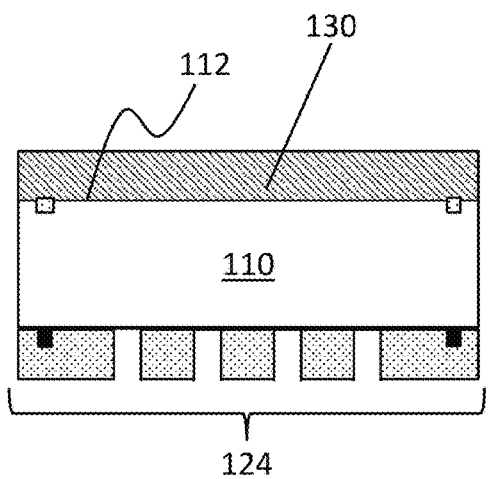
FIG. 1E          FIG. 1F
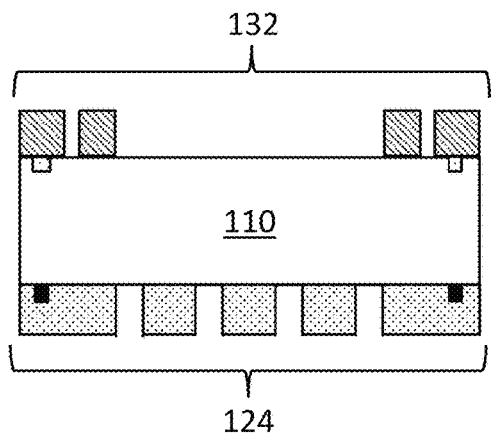
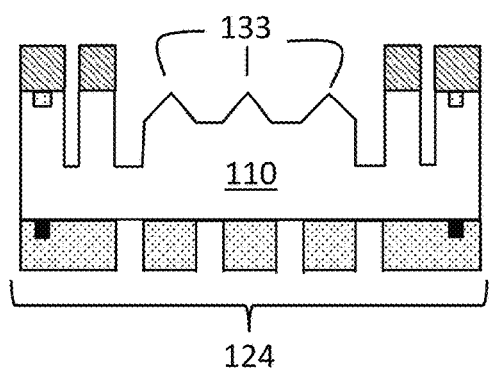
FIG. 1G          FIG. 1H

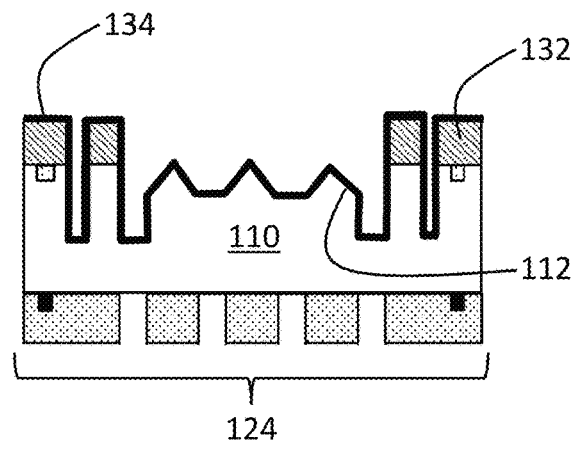
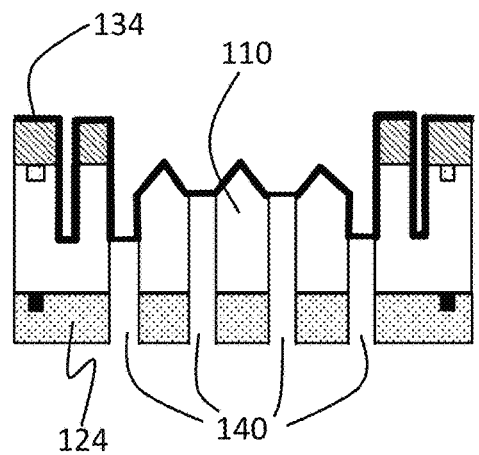
FIG. 1I  FIG. 1J
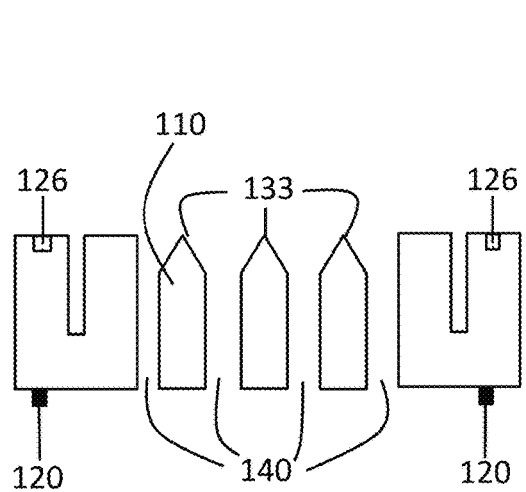
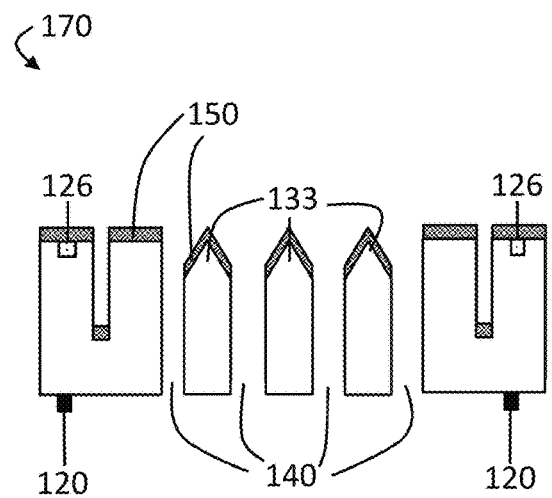
FIG. 1K  FIG. 1L

US 11,708,182 B2

ELECTROSPRAY DEVICES AND METHODS FOR FABRICATING ELECTROSPRAY DEVICES

GOVERNMENT SPONSORSHIP

This invention was made with Government support under FA8702-15-D-0001 awarded by the U.S. Air Force. The Government has certain rights in the invention.

TECHNICAL FIELD

Electrospray devices and methods for fabricating electrospray devices are generally described.

BACKGROUND

Electrospray propulsion can be used to provide thrust for miniaturized satellites, among other applications. Due to the potential for high specific impulse, fine control resolution, relative simplicity, and a tendency towards improved performance with miniaturization, electrospray thrusters have emerged as a method of active propulsion for this platform. Current state-of-the-art electrospray technology relies primarily on physical properties of a particular emitter array material.

SUMMARY

Electrospray devices and methods of fabricating electrospray devices are described herein. The subject matter of the present disclosure involves, in some cases, interrelated products, alternative solutions to a particular problem, and/or a plurality of different uses of one or more systems and/or articles.

In one aspect, an electrospray device comprising a solid substrate, one or more emitters formed on a first surface of the solid substrate, and one or more capillary pores formed in the solid substrate, wherein the one or more capillary pores are configured to transport a source of ions from a reservoir to the one or more emitters is described.

In another aspect a method of fabricating an electrospray device is described comprising etching a solid substrate to form one or more emitters on a first surface of the solid substrate, forming one or more capillary pores extending from the first surface to a second surface of solid substrate, and uniformly texturizing the first surface of the solid substrate.

In another aspect, an electrospray device comprising a solid substrate and one or more emitters formed on a first surface of the solid substrate, wherein a density of the one or more emitters on the solid substrate is at least 62,500/cm$^2$ is described.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures:

FIGS. 1A-1L schematically illustrate a method of fabricating an emitter structure that includes one or more emitters and one or more capillary pores, according to some embodiments;

DETAILED DESCRIPTION

Figure 2A:
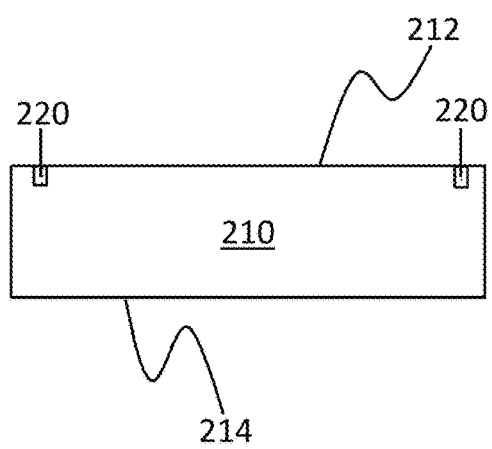
FIGS. 2A-2L schematically illustrate a method of fabricating an extractor plate with one or more apertures, according to some embodiments.

The present disclosure describes electrospray devices and methods of fabricating electrospray devices. Electrospray devices can provide a stream of charged particles (e.g., tiny droplets, ions) that are electrostatically extracted from a liquid source of ions. These devices may include one or more emitters adjacent to an extractor plate, where the extractor plate includes openings or apertures that can be aligned with the tips of the one or more emitters. It has been appreciated within the context of this disclosure that miniaturization of electrospray devices can benefit from microscale and nanoscale fabrication techniques on a solid substrate. For example, such microscale and nanoscale fabrication techniques may be used to fabricate electrospray devices for propulsion of a fully micro-fabricated satellite. By contrast, existing devices and methods for fabricating electrospray devices can be expensive to produce, difficult to fabricate, and do not provide the micro- and nano-scale control provided by devices and methods described herein. Specifically, existing devices and methods may suffer from poor alignment of the extractor plate apertures with the tips of the emitters and also cannot provide the same density of emitters per unit area on the surface of the substrate. In some cases, the devices and methods described herein are amenable to direct fabrication with a variety of solid substrates using microelectromechanical manufacturing systems (MEMS) while still meeting the various requirements for stable and efficient electrospray propulsion emissions. Additional advantages of devices and methods of this disclosure are described in more detail below.

The electrospray devices and methods of fabricating electrospray devices described herein may include a solid substrate. One or more emitters and/or one or more capillary pores that are fluidly connected to a reservoir for transporting a liquid from the reservoir to the one or more emitters may be formed in the solid substrate, as described further below, in addition to other features and components. The solid substrate can include a first surface and a second surface. In some embodiments, the first surface is opposite the second surface. According to some embodiments, at least a portion, and in some instances substantially all, of a surface (e.g., the first surface) of the solid substrate on which the one or more emitters are disposed can be uniformly texturized such that a surface texture of the surface may be substantially uniform. Advantageously, texturizing (e.g., uniformly texturizing) the surface of the solid substrate may increase the surface area of the substrate (or the emitters of a solid substrate), and thus, increase the wettability of the solid substrate and/or one or more emitters formed in the solid substrate. Texturizing is described further below.

The solid substrates included in the various embodiments disclosed herein can comprise a variety of materials. For example, the solid substrate can comprise silicon, germanium, and/or silicon carbide. However, other materials are possible, as this disclosure is not so limited. For example, the solid substrate can encompass a broad class of conductive or semiconducting materials, and those skilled in the art in view of the teachings of the present disclosure will be capable of selecting an appropriate material for the solid substrate based on the anticipated operating voltages of the emitter arrays, the type of ions emitted by the one or more emitters, and the materials of the other components included in an electrospray device.

A solid substrate can have any suitable thickness. The thickness of the substrate may be selected such that the substrate has a thickness suitable to avoid fragility of the substrate during fabrication but not too thick as to pose fabrication challenges, for example, when etching capillary pores through the thickness of the substrate. In some embodiments, the thickness of the solid substrate is greater than or equal to 100 microns, greater than or equal to 150 microns, greater than or equal to 200 microns, greater than or equal to 250 microns, greater than or equal to 300 microns, greater than or equal to 400 microns, greater than or equal to 500 microns, greater than or equal to 600 microns, greater than or equal to 700 microns, greater than or equal to 800 microns, greater than or equal to 900 microns, or greater than or equal to 1000 microns. In some embodiments, the thickness of the solid substrate is less than or equal to 1000 microns, less than or equal to 900 microns, less than or equal to 800 microns, less than or equal to 700 microns, less than or equal to 600 microns, less than or equal to 500 microns, less than or equal to 400 microns, less than or equal to 300 microns, less than or equal to 250 microns, less than or equal to 200 microns, less than or equal to 150 microns, or less than or equal to 100 microns. Combinations of the above-referenced ranges are also possible (e.g., greater than or equal to 100 microns and less than or equal to 500 microns). In some embodiments, the thickness of the solid substrate is greater than or equal to 690 microns and less than or equal to 730 microns. Other ranges are possible.

A solid substrate may have any suitable electrical resistivity. In some embodiments, the electrical resistivity of the solid substrate is greater than or equal to 25 ohm·cm, greater than or equal to 50 ohm·cm, greater than or equal to 100 ohm·cm, greater than or equal to 250 ohm·cm, greater than or equal to 500 ohm·cm, greater than or equal to 750 ohm·cm, greater than or equal to 1,000 ohm·cm, greater than or equal to 2,000 ohm·cm, greater than or equal to 3,000 ohm·cm, greater than or equal to 5,000 ohm·cm, greater than or equal to 7,000 ohm·cm, or greater than or equal to 10,000 ohm·cm. In some embodiments, the electrical resistivity of the solid substrate is less than or equal to 10,000 ohm·cm, less than or equal to 7,000 ohm·cm, less than or equal to 5,000 ohm·cm, less than or equal to 3,000 ohm·cm, less than or equal to 2,000 ohm·cm, less than or equal to 1,000 ohm·cm, less than or equal to 750 ohm·cm, less than or equal to 500 ohm·cm, less than or equal to 250 ohm·cm, less than or equal to 100 ohm·cm, less than or equal to 50 ohm·cm, or less than or equal to 25 ohm·cm. Combinations of the above-referenced ranges are also possible (e.g., greater than or equal to 100 ohm·cm and less than or equal to 500 ohm·cm). Other ranges are possible. The electrical resistivity of the substrate may be selected to provide a relatively high resistivity compared to existing electrospray devices in order to minimize electrochemical degradation of the electrospray devices described herein.

In some embodiments, the solid substrate can comprise an optional coating. For example, the solid substrate can be oxidized to form an oxide coating on the solid substrate. Advantageously, the coating may help prevent electrochemical damage to the substrate. In some embodiments, the solid substrate is silicon and the coating comprises silicon oxide. However, it should be understood that other coatings are possible as this disclosure is not so limited.

As described above, a solid substrate can include one or more emitters formed on one or more surfaces of the solid substrate. The one or more emitters may be used to ionize a source of ions (e.g., an ionizable liquid), for example, to provide propulsion. The one or more emitters may take on any suitable shape or geometry, such as a conical or needle-like shape. In embodiments with a conical or needle-like geometry, the one or more emitters can concentrate the electric field at or near the tip of the emitter in order to facilitate ionization of the source of ions. In some embodiments, a Taylor cone is created by the one or more emitters.

Any terms as used herein related to shape, orientation, alignment, and/or geometric relationship of or between, for example, one or more emitters, components, combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape, orientation, alignment, and/or geometric relationship include, but are not limited to terms descriptive of: shape—such as, round, square, circular/circle, rectangular/rectangle, triangular/triangle, cylindrical/cylinder, cone/conical, elliptical/ellipse, (n)polygonal/(n)polygon, U-shaped, line-shaped, etc.; angular orientation—such as perpendicular, orthogonal, parallel, vertical, horizontal, collinear, etc.; contour and/or trajectory—such as, plane/planar, coplanar, hemispherical, semi-hemispherical, line/linear, hyperbolic, parabolic, flat, curved, straight, arcuate, sinusoidal, tangent/tangential, etc.; arrangement—array, row, column, and the like. As one example, a fabricated article that would be described herein as being "square" would not require such an article to have faces or sides that are perfectly planar or linear and that intersect at angles of exactly 90 degrees (indeed, such an article can only exist as a mathematical abstraction), but rather, the shape of such article should be interpreted as approximating a "square," as defined mathematically, to an extent typically achievable and achieved for the recited fabrication technique as would be understood by those skilled in the art or as specifically described. As another example, one or more emitters that would be described herein as being in an "array" would not require such emitters to have centers that are perfectly arranged in row and columns in which all major axes of the emitters are aligned (indeed, such an array can only exist as a mathematical abstraction), but rather, the arrangement of such emitters should be interpreted as approximating an "array", as defined mathematically, to an extent typically achievable and achieved for the recited fabrication technique as would be understood by those skilled in the art or as specifically described. Additionally, while the arrays described herein relative to the figures and examples are regular arrays with a repeating pattern of emitters and capillaries formed in a substrate, the use of irregular arrays of emitters and capillary portion that are not arranged in a periodic and/or symmetrical arrangement are also contemplated as the disclosure is not so limited.

According to some embodiments, one or more emitters is formed on a surface (e.g., a first surface) of the solid substrate. The one or more emitters may be formed in the solid substrate by etching the solid substrate. A variety of etching process are suitable to etch the solid substrate. For example, grayscale photolithography can be used to etch or form the one or more emitters on a surface of the solid substrate. Grayscale photolithography describes a technique used to etch a solid substrate (e.g., a semiconductor, silicon) substantially along a perpendicular axis (e.g., a z-axis) relative to the surface of the solid substrate (e.g., an xy-surface). This may result in an emitter surface that has 3-dimensional emitters formed on and extending from the surface from a base of each emitter up to a corresponding emitter tip where each emitter may exhibit a desired overall size and shape. However, it should be understood that other appropriate etching techniques other than grayscale photolithography may also be used.

Etching (e.g., via grayscale photolithography) one or more emitters on a surface of the solid substrate may provide the emitter with a particular geometry on the surface of the emitter. For example, in some embodiments, the surface of the emitter may have a step-like texture. Without wishing to be bound by any theory, the inclusion of a step-like texture on the emitter surface may facilitate control of the hydraulic impedance of the source of ions. For example, the step-like texture may provide a particular range of flow rates for the source of ions (e.g., a liquid source of ions). In some embodiments, a gradient in thickness of the texturized steps on the surface of the emitter may be provided. The gradient can be adapted and arranged such that the steps are thicker towards the tip of the emitter and thinner towards the base of the emitter. Advantageously, texturizing the tips of the one or more emitters may provide improved wetting of the surface by a liquid source of ions to control a flow of the liquid to the tips of the emitters.

Each of the one or more emitters may have a particular largest transverse cross-sectional dimension such as a diameter that is measured in a direction substantially parallel to a surface from which the emitter extends. As used herein, a transverse cross-sectional dimension and a diameter may be used interchangeably depending on the particular geometry of an emitter. The transverse cross-sectional dimension of the one or more emitters can be selected such that the emitter density is increased (i.e., a smaller transverse cross-sectional dimension) but also such that the transverse cross-sectional dimension is not so small as to cause a large increase in surface tension of a liquid when a liquid source of ions is provided to the one or more emitters. Thus, it should be understood that the dimensions, and corresponding ratios, of the one or more emitters may be selected to provide a balance between a desired emitter density, corresponding operational voltages, and a desired alignment error. In some embodiments, the largest cross-sectional dimension of an emitter is greater than or equal to 10 microns, greater than or equal to 20 microns, greater than or equal to 30 microns, greater than or equal to 40 microns, greater than or equal to 50 microns, greater than or equal to 60 microns, greater than or equal to 70 microns, greater than or equal to 80 microns, greater than or equal to 90 microns, or greater than or equal to 100 microns. In some embodiments, the largest cross-sectional dimension of an emitter is less than or equal to 100 microns, less than or equal to 90 microns, less than or equal to 80 microns, less than or equal to 70 microns, less than or equal to 60 microns, less than or equal to 50 microns, less than or equal to 40 microns, less than or equal to 30 microns, less than or equal to 20 microns, or less than or equal to 10 microns. Combinations of the above-referenced ranges are also possible (e.g., greater than or equal to 20 microns and less than or equal to 50 microns). Other ranges are possible.

Each of the one or more emitters may have a particular height where the height corresponds to a distance measured in a direction substantially perpendicular to a surface from which the emitter extends, from a distal most point of an emitter tip to a point where the emitter meets the substantially perpendicular surface. In some embodiments, the height of each of the one or more emitters may be selected as to minimize spontaneous emission from the surface of the substrate. For instance, in some embodiments, the height of each of the one or more emitters may be selected such that the height is equal to or greater than a distance from the tip of the one or more emitters to the corresponding extractor plate. In some embodiments, the height of the one or more emitters is greater than or equal to 50 microns, greater than or equal to 60 microns, greater than or equal to 70 microns, greater than or equal to 80 microns, greater than or equal to 90 microns, greater than or equal to 100 microns, greater than or equal to 105 microns, greater than or equal to 110 microns, greater than or equal to 115 microns, greater than or equal to 120 microns, greater than or equal to 125 microns, greater than or equal to 130 microns, greater than or equal to 135 microns, greater than or equal to 140 microns, greater than or equal to 145 microns, greater than or equal to 150 microns, greater than or equal to 175 microns, greater than or equal to 200 microns, greater than or equal to 225 microns, greater than or equal to 250 microns, greater than or equal to 275 microns, or greater than or equal to 300 microns. In some embodiments, the height of the one or more emitters is less than or equal to 300 microns, less than or equal to 275 microns, less than or equal to 250 microns, less than or equal to 225 microns, less than or equal to 200 microns, less than or equal to 175 microns, less than or equal to 150 microns, less than or equal to 145 microns, less than or equal to 140 microns, less than or equal to 135 microns, less than or equal to 130 microns, less than or equal to 125 microns, less than or equal to 120 microns, less than or equal to 115 microns, less than or equal to 110 microns, less than or equal to 105 microns, less than or equal to 100 microns, less than or equal to 90 microns, less than or equal to 80 microns, less than or equal to 70 microns, less than or equal to 60 microns, or less than or equal to 50 microns. Combinations of the above-referenced ranges are also possible (e.g., greater than or equal to 50 microns and less than or equal to 300 microns). Other ranges are possible.

According to some embodiments, the devices and methods described herein may also include one or more capillary pores formed in a substrate that fluidly connects a first surface of a substrate to a reservoir including a liquid source of ions (e.g., a propellant) that the capillary pores may be in fluidic communication with. For example, the capillary pores are configured to draw a liquid through the pores from the reservoir to the first surface via capillary action. Accordingly, in embodiments in which one or more emitters are disposed on the first surface, the one or more capillary pores may be in fluidic communication with the one or more emitters and can provide a source of ions (e.g., a propellant) to the emitters via capillary action. Thus, the one or more capillary pores may provide a particular capillary pressure to the liquid source of ions relative to any other surrounding fluid.

In some embodiments, the capillary pores extend from a first surface to a second surface of the solid substrate. In some cases, the capillary pores extend through the solid substrate from the first surface to a second opposing surface of the solid substrate. In some embodiments, the first surface between the capillary pores and the emitters is configured to be wetted by the source of ions. The one or more capillary pores can also be an array of capillary pores disposed uniformly within the solid substrate and may wet or otherwise provide a source of ions to an array of emitters of the solid substrate.

According to some embodiments, forming the one or more capillary pores comprises etching the capillary pores. In some embodiments, the one or more capillary pores are anisotropically etched. Suitable etching methods that may be used for etching the capillary pores such that they extend through a substrate include, but are not limited to, deep reactive ion etching, Bosch Si etching, and metal-assisted chemical etching. However, it should be understood that other etching process are possible.

The one or more capillary pores may be of any suitable size or transverse cross-sectional dimension. For example, in some embodiments, a cross-sectional diameter or other transverse cross-sectional dimension of the one or more capillary pores is greater than or equal to 1 micron, greater than or equal to 5 microns, greater than or equal to 10 microns, greater than or equal to 20 microns, greater than or equal to 30 microns, greater than or equal to 40 microns, greater than or equal to 50 microns, greater than or equal to 60 microns, greater than or equal to 70 microns, greater than or equal to 80 microns, greater than or equal to 90 microns, or greater than or equal to 100 microns. In some embodiments, a diameter or other transverse cross-sectional dimension of the one or more capillary pores is less than or equal to 100 microns, less than or equal to 90 microns, less than or equal to 80 microns, less than or equal to 70 microns, less than or equal to 60 microns, less than or equal to 50 microns, less than or equal to 40 microns, less than or equal 30 microns, less than or equal to 20 microns, less than or equal to 10 microns, less than or equal to 5 microns, or less than or equal to 1 micron. Combinations of the above-referenced ranges are also possible (e.g., greater than or equal to 10 microns and less than or equal to 100 microns). Other ranges are possible.

In some embodiments, there may be a particular ratio of capillary pores to emitters. In some embodiments, the ratio of capillary pores to emitters is at least 1:1, at least 1.5:1, at least 2:1, at least 2.5:1, at least 3:1, at least 3.5:1, at least 4:1, at least 4.5:1, or at least 5:1. In some embodiments, the ratio of capillary pores to emitters is no greater than 5:1, no greater than 4.5:1, no greater than 4:1, no greater than 3.5:1, no greater than 3:1, no greater than 2.5:1, no greater than, 2:1, no greater than 1.5:1, or no greater than 1:1. Combinations of the above-referenced ranges are also possible (e.g., at least 1:1 and no greater than 2:1). Other ranges are possible. A particular ratio of capillary pores to emitters can ensure that each emitter is in fluidic communication with at least one capillary pore.

While certain embodiments may include one or more capillary pores formed within the solid substrate, in other embodiments, the one or more capillary pores is absent, and the solid substrate includes no capillary pores. In such embodiments with no capillary pores, the one or more emitters may be externally wetted.

The electrospray devices may include one or more surfaces that are uniformly textured to provide improved wetting as compared to the same surface without texturing. In some embodiments, the solid substrate and/or the one or more emitters comprises a texturized surface. For example, in order to ionize a source of ions, a surface of the solid substrate (e.g., the surface of an emitter, an emitter tip) may be in fluid communication with the source of ions. In some embodiments, the solid substrate and/or the surface of the emitters can be uniformly texturized to provide a micropillar or "hair"-like texture on the surface. The micropillar surface can increase the surface area of the solid substrate which may modify the wettability of the surface by a liquid ion source. Additionally, in embodiments in which the textured surface is applied to the one or more emitters the surface texture may facilitate the wetting, and thus transport, of the liquid ion source from the adjacent surface from which the emitters extended to a distal emitter tip of each emitter. Additionally, the micropillars may also enhance the electric field formed at the tips of the emitters facilitating the ionization of the source of ions (e.g., the propellant). Accordingly, in some embodiments, the tip of the one or more emitters may also be texturized. In some embodiments, the texturization is conformal along the surface of the one or more emitters. Further in some instances, the texturization is conformal along substantially an entire surface, or a portion of a surface, upon which the one or more emitters are formed.

As mentioned above, a variety of suitable techniques can be used to texturize (e.g., uniformly texturize) the surface of the solid substrate and/or the one or more emitters. In some embodiments, texturizing comprises metal-assisted chemical etching (MACE). As understood by those skilled in the art, MACE is a wet chemical etching process for solid substrates (e.g., semiconductors, silicon) that uses metal films or nanoparticles as a catalyst for the etch process. Metals such as gold, platinum, nickel, and silver can be catalysts for the process. In some embodiments, silver nanoparticles can be used to etch one or more emitters in the solid substrate and can also provide texturization to the one or more emitters. In some embodiments, a MACE process includes plating silver nanoparticles (e.g., provide by a solution of 0.001 M $AgNO_3$) on a silicon substrate. In such an embodiment, the size (e.g., an average cross-sectional diameter) of the silver nanoparticles can be 100 nm. The etch can be facilitated with hydrofluoric acid (e.g., 4.8 M HF), followed by texturing the silicon etch with hydrogen peroxide and HF (e.g., 0.2 M $H_2O_2$). It has been recognized and appreciated within the context of this disclosure that texturizing the solid substrate and/or the surface of one or more emitters can improve the performance (e.g., wettability, production of ionized species, thrust) of the electrospray device. It should be understood, however, that other etching processes, including other MACE etching processes different than the process described herein, may be used as this disclosure is not so limited.

In some embodiments, the one or more emitters comprises silicon and the texturized emitters comprise black silicon. As understood by those skilled in the art, black silicon is a needle-shaped surface structure where needles are made of single-crystalline silicon and may have a height above 10 μm and diameter less than 1 μm. One feature of black silicon is its increased absorption of incident light—the high reflectivity of the silicon, which is usually 20-30% for quasi-normal incidence, is reduced to about 5%. This is due to the formation of a so-called effective medium by the needles. Within this medium, there is no sharp interface, but a continuous change of the refractive index that reduces Fresnel reflection. When the depth of the graded layer is roughly equal to the wavelength of light in silicon (about one-quarter the wavelength in vacuum) the reflection is reduced to 5%; deeper grades produce even blacker silicon. For low reflectivity, the nanoscale features producing the index graded layer must be smaller than the wavelength of the incident light to avoid scattering. MACE may be used to texturize silicon into black silicon. Of course, it should be understood that while the use of black silicon is noted above, embodiments in which other substrate materials are used with similarly textured surfaces are also contemplated as the disclosure is not so limited.

In some embodiments, texturizing the surface of a solid substrate and/or one or more emitters disposed thereon may result in the formation of micropillars on the surface. That is to say, texturizing the surface of the substrate or the one or more emitters may create a plurality of micropillars uniformly distributed across the texturized surfaces of the substrate and/or the emitters, though instances in which different portions of a surface have different textures due to different processes being applied in those locations are also contemplated. In some embodiments, each micropillar may, optionally, have a particular length (e.g., an average length). In some embodiments, the micropillars extends from a surface (e.g., the surface of the solid substrate, the surface of the emitter) with an average a length of greater than or equal to 1 micron, greater than or equal to 2 microns, greater than or equal to 3 microns, greater than or equal to 4 microns, or greater than or equal to 5 microns. In some embodiments, the micropillars have an average length of less than or equal to 5 microns, less than or equal to 4 microns, less than or equal 3 microns, less than or equal to 2 microns, or less than or equal to 1 micron. Combinations of the above-referenced ranges are also possible (e.g., greater than or equal to 3 microns and less than or equal to 5 microns). Other ranges are possible.

The electrospray devices and methods of fabricating electrospray devices described herein can also include a particular density of emitters. The density of emitters can be defined by the number of one of more emitters per unit area on the surface of the solid substrate. The devices and methods described herein may have a density of emitters much higher than those seen in existing electrospray devices and methods, which can improve the ability to ionize the source of ions (e.g., a propellant) as well as provided more propulsion in some applications. In some embodiments, the density of the one or more emitters (e.g., an array of emitters) on the solid substrate is greater than or equal to 20,000/$cm^2$, greater than or equal to 25,000/$cm^2$, greater than or equal to 30,000/$cm^2$, greater than or equal to 40,000/$cm^2$, greater than or equal to 50,000/$cm^2$, greater than or equal to 55,000/$cm^2$, greater than or equal to 60,000/$cm^2$, greater than or equal to 62,500/$cm^2$, greater than or equal to 65,000/$cm^2$, greater than or equal to 70,000/$cm^2$, greater than or equal to 75,000/$cm^2$, greater than or equal to 80,000/$cm^2$, greater than or equal to 85,000/$cm^2$, greater than or equal to 90,000/$cm^2$, greater than or equal to 95,000/$cm^2$, greater than or equal to 100,000/$cm^2$, greater than or equal to 110,000/$cm^2$, greater than or equal to 120,000/$cm^2$, greater than or equal to 130,000/$cm^2$, greater than or equal to 140,000/$cm^2$, greater than or equal to 150.000/$cm^2$, or greater than or equal to 160,000/$cm^2$. In some embodiments, the density of the one or more emitters on the solid substrate is less than or equal to 160,000/$cm^2$, less than or equal to 150,000/$cm^2$, less than or equal to 140,000/$cm^2$, less than or equal to 130,000/$cm^2$, less than or equal to 120,000/$cm^2$, less than or equal to 110,000/$cm^2$, less than or equal to 100.000/$cm^2$, less than or equal to 95,000/$cm^2$, less than or equal to 90,000/$cm^2$, less than or equal to 85,000/$cm^2$, less than or equal to 80,000/$cm^2$, less than or equal to 75,000/$cm^2$, less than or equal to 70,000/$cm^2$, less than or equal to 65,000/$cm^2$, less than or equal to 62,500/$cm^2$, less than or equal to 60,000/$cm^2$, less than or equal to 55,000/$cm^2$, less than or equal to 50,000/$cm^2$, less than or equal to 40,000/$cm^2$, less than or equal to 30,000/$cm^2$, less than or equal to 25,000/$cm^2$, or less than or equal to 20,000/$cm^2$. Combinations of the above-referenced ranges are also possible (e.g., greater than or equal to 62,000/$cm^2$ and less than or equal to 80,000/$cm^2$). Other ranges are possible.

The one or more emitters (e.g., an array of emitters) may have a particular pitch between each emitter or each emitter tip. The pitch describes the distance between each emitter, for example, in an array of emitters, and can typically be measured from tip to tip of each emitter on the solid substrate. Providing a particular pitch between each emitter can provide adequate spacing for the one or more capillary pores in fluidic communication with the one or more emitters and can also provide for a particular density of the emitters on the surface of the solid substrate. It has been discovered and appreciated within the context of the present disclosure that the distance between emitters (i.e., the pitch) can be reduced compared to the existing electrospray devices, and may result in an increase of charged ions (e.g., aerosol density) produced by the one or more emitters.

In some embodiments, the pitch between each emitter is less than or equal to 100 microns, less than or equal to 90 microns, less than or equal to 80 microns, less than or equal to 70 microns, less than or equal to 65 microns, less than or equal to 60 microns, less than or equal to 55 microns, less than or equal to 50 microns, less than or equal to 40 microns, less than or equal to 35 microns, less than or equal to 30 microns, less than or equal to 25 microns, or less than or equal to 20 microns. In some embodiments, the pitch between each emitter is greater than or equal to 20 microns, greater than or equal to 25 microns, greater than or equal to 30 microns, greater than or equal to 35 microns, greater than or equal to 40 microns, greater than or equal to 45 microns, greater than or equal to 50 microns, greater than or equal to 55 microns, greater than or equal to 60 microns, greater than or equal to 65 microns, greater than or equal to 70 microns, greater than or equal to 80 microns, greater than or equal to 90 microns, or greater than or equal to 100 microns. Combinations of the above-referenced ranges are also possible (e.g., greater than or equal to 40 microns and less than or equal to 80 microns). Other ranges are possible.

According to some embodiments, a source of ions may be present adjacent to and/or in contact with the one or more emitters. The source of ions can be a liquid source of ions, such as a propellant, that can be ionized by the one or more emitters and/or an extractor (e.g., an extractor plate, an extractor electrode) disposed downstream from a substrate in which the one or more emitters are formed. In some embodiments, a power source ionizes the source of ions. Ionizing and emitting a stream of ions using the source of ions can generate thrust, which can be useful for certain applications, such as satellite propulsion, which is described elsewhere herein. In some embodiments, one or more capillary pores in fluidic communication with the one or more emitters can act as a conduit to passively provide the sources of ions to the one or more emitters. In some embodiments, the source of ions wets the one or more emitters or the tips of the one or more emitters. The texturized surface of the emitter and/or the tip of the emitter may enhance wettability of the one or more emitter and/or a surrounding surface of the solid substrate to the source of ions. In some, the source of ions is at least partially contained in a reservoir.

The source of ions can be a variety of chemical species. For example, in some embodiments, the source of ions may be an ionic liquid (e.g., 1-ethyl-3-methylimidazolium tetrafluoroborate). However, other sources of ions are possible, such as a molten salt (e.g., a room temperature molten salt), organic solvents (e.g., glycerol, formamide), and liquid metals (e.g., cesium, indium), without limitation. Thus, it should be understood that a source of ions for use with the electrospray devices disclosed herein may correspond to any appropriate liquid source of ions that may be produced and emitted by an electrospray device as the disclosure is not limited to any particular source of ions.

In some embodiments, the source of ions wets the emitter tips. The wettability of the source of ions can be measured by the contact angle of the source of ions on the emitter tip. As understood by those skilled in the art, the contact angle can be used to measure the wettability of a liquid on a solid surface. A contact angle of less than 90° (e.g., less than 80°, less than 70°, less than 60°, less than 50°, less than 40°, less than 30°, less than 20°, less than 10°, less than 5°, less than 1°) may indicate appropriate wettability between the emitter tip and the source of ions.

Turning now to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIGS. 1A-1L illustrate one embodiment of a method for fabricating an electrospray device. As described above, devices and methods can include a solid substrate. For example, FIG. 1A schematically illustrates a solid substrate 110. The solid substrate may include a first surface and a second surface. In some embodiments, the first surface and the second surface are on opposing sides of the solid substrate. For example, solid substrate 110 in FIG. 1A includes a first (front) surface 112 and an opposing second (back) surface 114.

In some embodiments, a target may be formed or placed adjacent the solid substrate. Targets may help with alignment of certain components on the solid substrate or an adjoining extractor plate. FIG. 1B shows a schematic in which (first) targets 120 have been positioned on back surface 114 of solid substrate 110.

According to some embodiments, a mask may be deposited onto the solid substrate. Masks may be deposited and patterned (e.g., via photolithography) to provide micro- or nano-level features or facets to the solid substrate. For example, referring to FIG. 1C, a (first) mask 122 has been deposited on back surface 114 of solid substrate 110. Referring now to FIG. 1D, mask 122 has been patterned and etched to form (first) etched mask 124. In some embodiments, the etched first mask is subsequently used to form capillary pores in the solid substrate.

The mask can be deposited using any suitable technique. For example, in some embodiments, the mask is deposited using chemical vapor deposition (CVD). However, other techniques can be used including physical vapor deposition, spin coating, spray coatings, atomic layer deposition, and thermal oxidation. Other depositions techniques are possible.

The mask can be a variety of suitable materials. In some embodiments, the mask comprises an oxide (e.g., silicon oxide). Other non-limiting examples include metals, nitrides, and organic resist materials. Other materials are possible.

In some embodiments, a deposited mask may have a particular thickness. In some embodiments, the thickness of the mask is greater than or equal to 1 nm, greater than or equal to 5 nm, greater than or equal to 10 nm, greater than or equal to 25 nm, greater than or equal to 50 nm, greater than or equal to 75 nm, greater than or equal to 100 nm, greater than or equal to 250 nm, greater than or equal to 500 nm, greater than or equal to 750 nm, greater than or equal to 1 micron, greater than equal to 5 microns, or greater than or equal to 10 microns. In some embodiments, the deposited mask is less than or equal to 10 microns, less than or equal to 5 microns, less than or equal to 1 micron, less than or equal to 750 nm, less than or equal to 500 nm, less than or equal to 250 nm, less than or equal to 100 nm, less than or equal to 75 nm, less than or equal to 50 nm, less than or equal to 25 nm, less than or equal to 10 nm, less than or equal to 5 nm, or less than or equal to 1 nm. Combinations of the above-reference ranges are also possible (e.g., greater than or equal to 10 nm and less than or equal to 1 micron). Other ranges are possible.

In some embodiment, additional targets can be applied or etched into the solid substrate. For example, in FIG. 1E, a second set of targets 126 have been etched in front surface 112 of solid substrate 110. As shown in the figure, the second set of targets 126 are complementarily positioned to the first set of targets 120. However, it should be understood that targets can be positioned or etched on any suitable portion of the solid substrate.

In some embodiments, one or more additional masks may be deposited on the solid substrate. For example, as shown in FIG. 1F, a second mask 130 has been deposited on front surface 112 of solid substrate 110. The one or more additional masks may also be patterned and etched. For example, as shown in FIG. 1G, second mask 130 has been patterned and etched to form an etched second mask 132.

As described elsewhere herein, electrospray devices and methods include one or more emitters. For example, FIG. 1H schematically illustrates an array of emitters 133 formed (e.g., etched) in solid substrate 110. While shown as 2-dimensional a cross-sectional view in the figure, it should be understood that array of emitters 133 may extend in three dimensions to form a 3-dimensional array. Each of the emitters may have a needle-like or conical shape, which is also schematically depicted in FIG. 1H. However, it should be understood that, in other embodiments, non-conical geometries each emitter can also be formed or used.

In some embodiments, an etch stop (e.g., an etch stop layer) may be deposited adjacent the mask (e.g., the first mask) and/or the solid substrate (e.g., one or more emitters formed in the solid substrate). For example, in reference to FIG. 1I, a (first) etch 134 has been deposited onto the first surface 112 of the solid substrate 110 and etched second mask 132. The etch stop can be used to prevent undesired etching of some portions of the solid substrate. For instance, as shown in FIG. 1J, an array of capillary pores 140 has been etched into solid substrate 110 through etched first mask 124 and through back surface 114. In some embodiments, the solid substrate is anisotropically etched, which can form capillary pores that extend primarily perpendicular to a surface (e.g., a front surface, a back surface) of the solid substrate while not substantially extending along the plane of the solid substrate. Note, however, that the etching has stopped at etch stop 134. The etch stop can subsequently be removed, sometimes along with one or more masks. For example, as schematically shown in FIG. 1K, etch stop 134, etched first mask 124, and etched second mask 132 of FIG. 1J have been removed from solid substrate 110 relative to FIG. 1K, leaving behind array of emitters 133 and array of capillary pores 140. In some embodiments, the etch stop and mask are removed simultaneously; however, in other embodiments, the etch stop and mask are removed sequentially. While FIG. 1J and FIG. 1K depict an array of capillary pores, it should be understood that, in some embodiments, the array of capillary pores is absent, such that the solid substrate does not include capillary pores.

The etch stop (e.g., an etch stop layer) can be any suitable material that prevents etching in undesired areas. For example, in some embodiments, the etch stop include metals, nitrides, oxides, and/or organic resists. Other etch stops are also possible.

A variety of suitable chemical species can be used to remove a mask and/or an etch stop. For example, in some embodiments, hydrofluoric acid (HF) can be used to remove a mask and/or an etch stop. However, other chemical species to remove a mask are possible including a buffered oxide etch (BOE), hydrochloric acid (HCl), phosphoric acid ($H_3PO_4$), nitric acid ($HNO_3$), aqua regia (e.g., mixtures of HCl and $NO_3$), piranha solution (e.g., mixtures of sulfuric acid and hydrogen peroxide), without limitation.

As described above, the solid substrate (e.g., the one or more emitters of the solid substrate) can be texturized. As shown schematically in FIG. 1L, array of emitters 133 has been texturized with texturization 150 as a component of emitter structure 170. Details regarding texturization are described elsewhere herein. As shown in the figure, the texturization may be a conformal texturization of the surface, or a portion of a surface, on which the one or more emitters are formed.

Devices and methods described herein can also include an extractor, such as an extractor plate or an extractor electrode. The extractor may act as a counterelectrode that attracts the ionized source of ions thereby providing thrust or propulsion, for example, to a microsatellite. Accordingly, in some embodiments, the extractor is electrically insulated from the one or more emitters. In some embodiments, the extractor comprises an electrically conductive material.

FIGS. 2A-2L schematically illustrate a method of fabricating an extractor plate. For, example in FIG. 2A, a second substrate 210 can have a front surface 212 and a back surface 214. The second substrate can be of the same or different material from the solid substrate described above. Second substrate 210 can also include a third set of targets 220. These targets can be complementary to the first and/or the second set of targets or may be formed in other, positions on the second substrate.

Figure 2B:
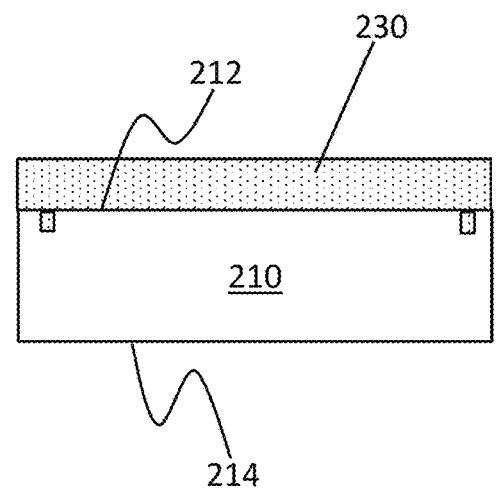
Figure 2C:
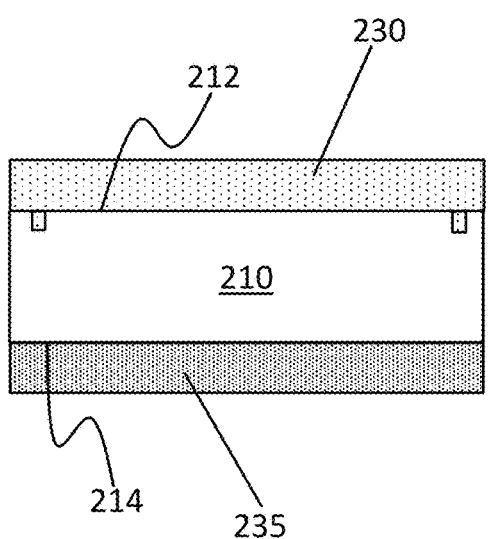
Figure 2D:
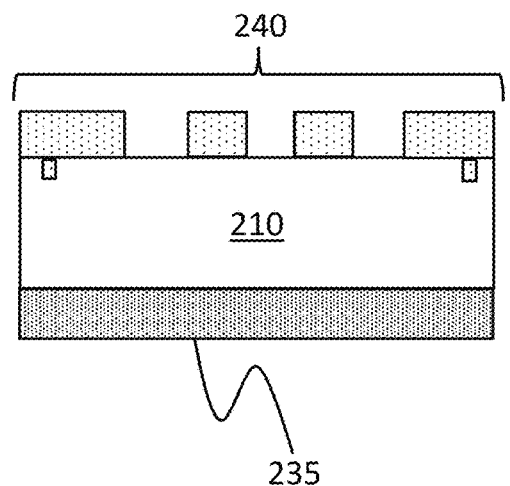
Figure 2E:
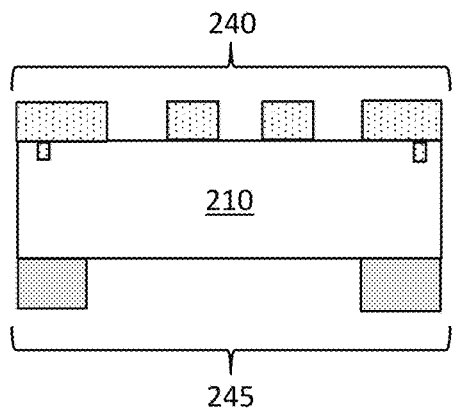

A third mask 230 can be deposited adjacent to front surface 212 of second substrate 220, as shown in FIG. 2B, and a fourth mask 235 can be deposited adjacent back surface 214 of second substrate 220, as shown in FIG. 2C. The third and fourth mask can be the same or different materials and can also be the same or different material than the first mask or the second mask. The third mask and the fourth mask may be etched. For example, as shown in FIG. 2D and FIG. 2E, third mask 230 and fourth mask 235 are etched to form etched third mask 240 and etched fourth masked 245, respectively.

Figure 2F:
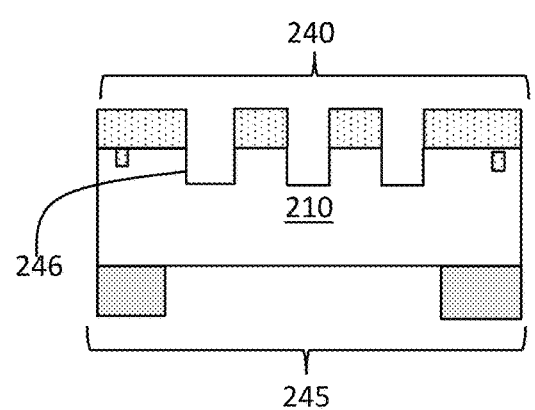
Figure 2G:
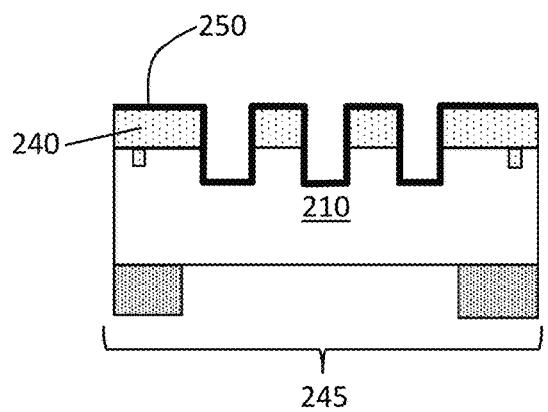
Figure 2H:
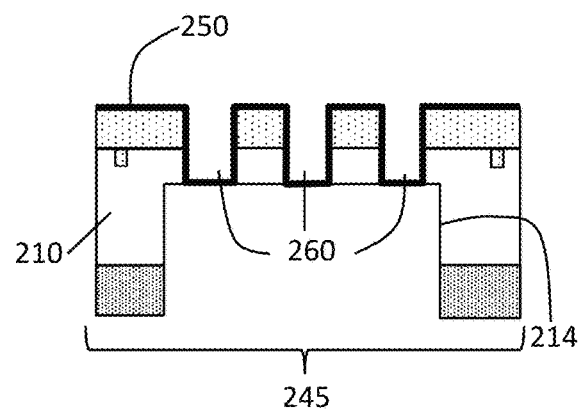
Figure 2I:
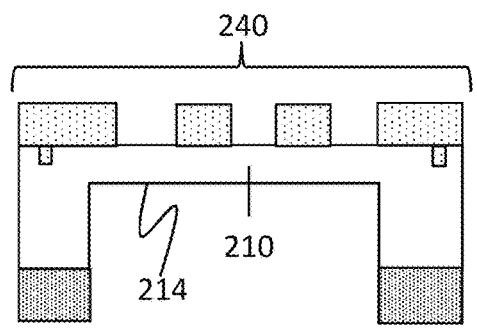
Figure 2J:
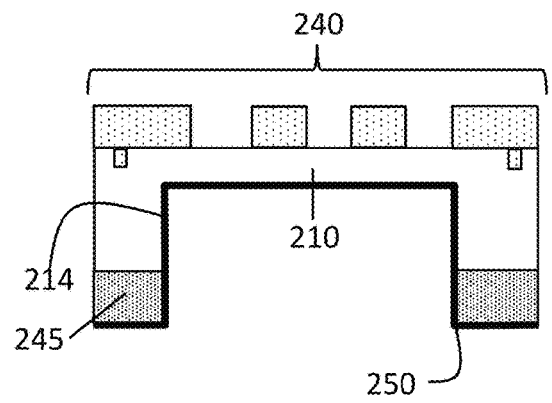
Figure 2K:
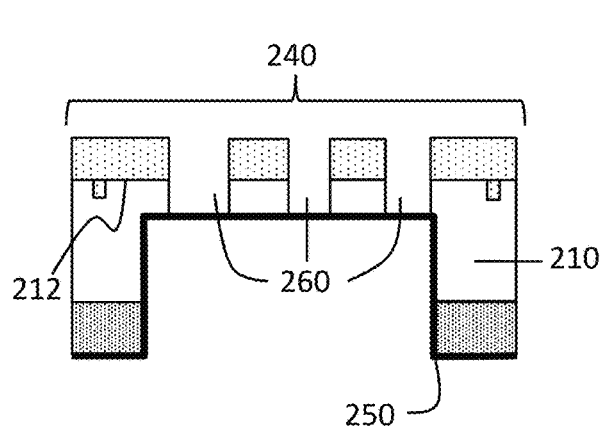
Figure 2L:
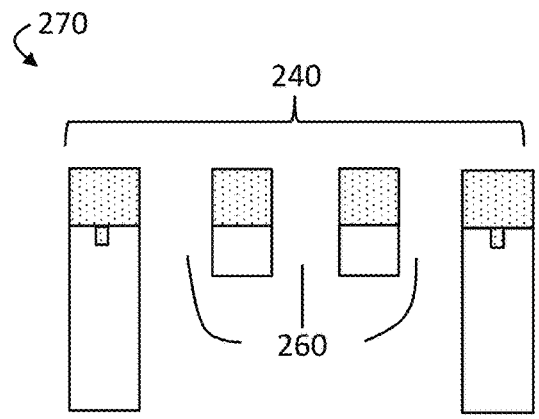

One or more apertures (e.g., an array of apertures) can be formed or included within the extractor plate. Referring now to FIG. 2F, second substrate 210 is schematically shown to be at least partially etched (e.g., etching 246) proximate to etched third mask 240. An etch stop may then be deposited adjacent the etched mask, as shown in FIG. 2G, which schematically depicts second etch stop 250 adjacent to etched third mask 240. An array of apertures may then be formed. For example, in FIG. 2H, second substrate 210 is etched from back surface 214 to form an of array of apertures 260. Alternatively, the array of apertures can also be formed by etching the second substrate from the front surface. For example, as shown in FIGS. 2I and 2J, the second substrate can be at least partially etched from back surface 214 and the second etch stop 250 can be deposited adjacent to etched fourth mask 245 and back surface 214. The array of apertures 260 may then be etched into second substrate 210 from front surface 212, as shown in FIG. 2K. The etch stop and mask can be removed, as schematically illustrated in FIG. 2L relative to FIG. 2K, to provide extractor plate 270.

Figure 3A:
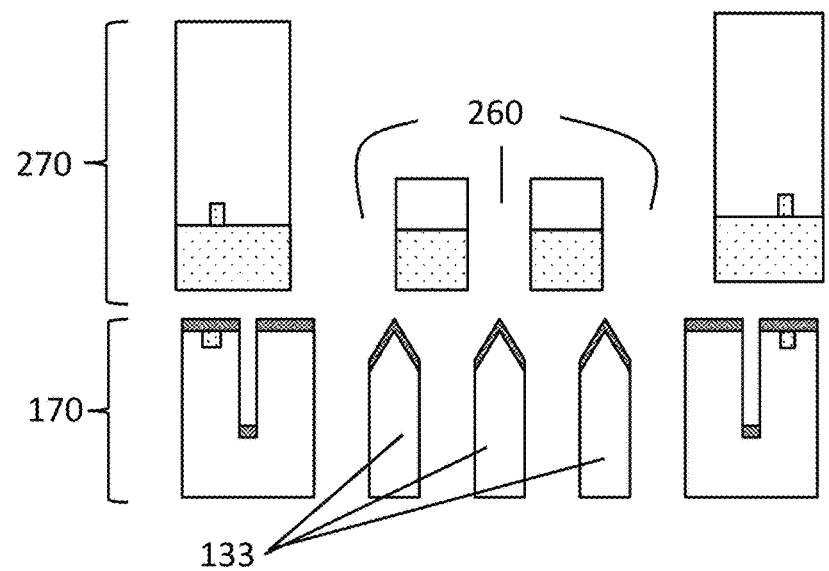
FIGS. 3A-3B is a schematic of an electrospray device including an emitter structure and an extractor plate, according to some embodiments.
Figure 3B:
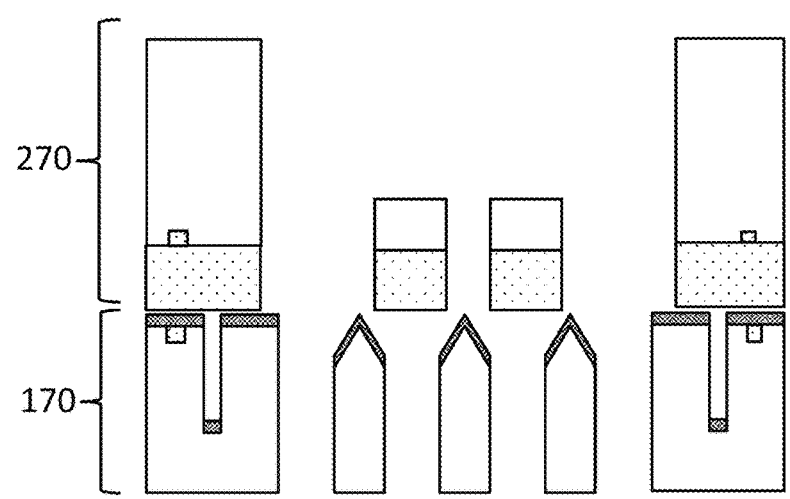
Figure 6:
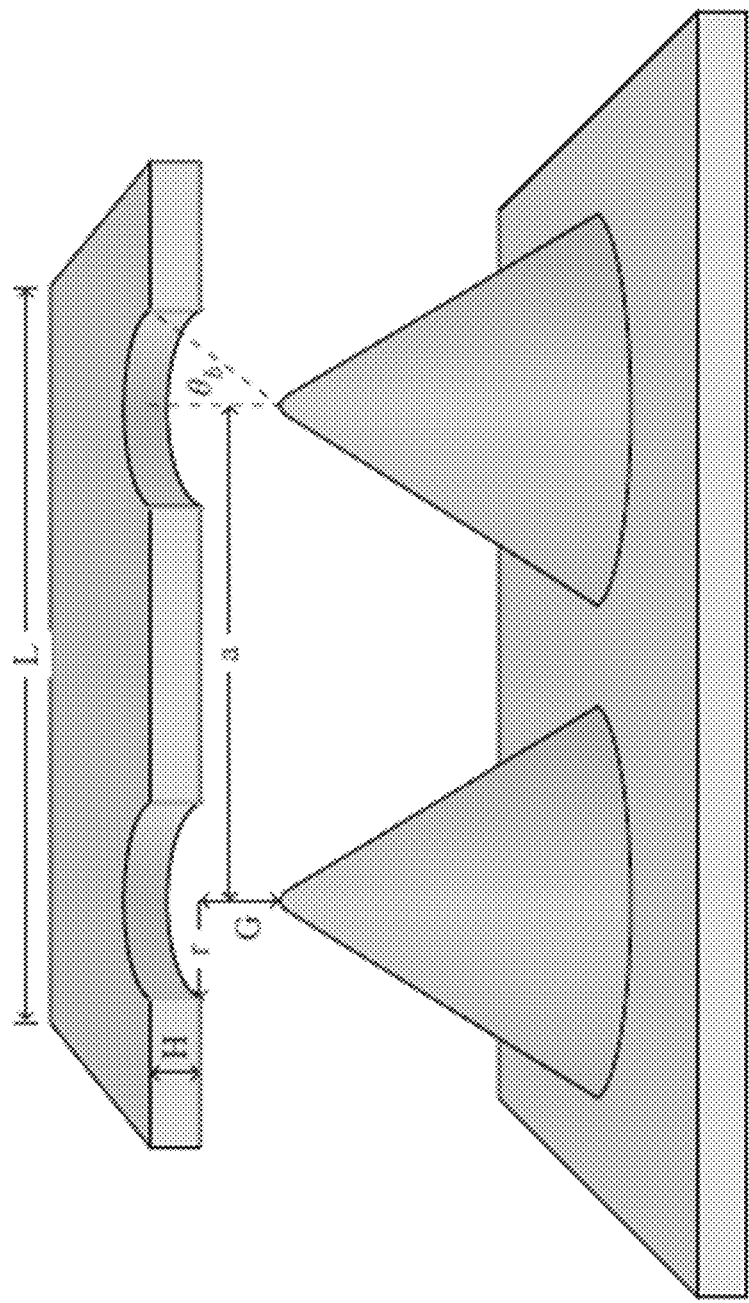
FIG. 6 is a schematic diagram of emitters aligned with the apertures of an extractor plate, according to some embodiments.

The one or more apertures (e.g., the array of apertures) may be sized and arranged to be complementary to the one or more emitters (e.g., an array of emitters) such that the tips of the one or more emitters align with the openings of the one or more apertures of the extractor plate. For example, in reference to FIG. 3A, electrospray device 300 comprises emitter structure 170 and extractor plate 270 disposed downstream from the emitter structure, and the array of apertures are complementary aligned with the array of emitters included in emitter structure 170. In some cases, the emitter structure and the extractor plate may be bonded together. For example, as schematically shown in FIG. 3B, emitter structure 170 is bonded with extractor plate 270. In some embodiments, a precision alignment tool is used to align and/or bond the emitter structure with the extractor plate. In some embodiments, the precession alignment tool comprises an ultra-precise die or "flip chip" bonding equipment that can allow extractor apertures to be aligned with the emitters included in the emitter structure (e.g., ±0.5 μm placement accuracy and ±1 μm post-bond accuracy), although any appropriate method of aligning an extractor plate and emitter structure may be used as disclosure is not limited to any particular method of aligning and bonding these structures to one another. FIG. 6 shows a cross-sectional schematic of emitters aligned with the apertures of an extractor plate.

As noted above, the apertures of the extractor plate may align complementarily with one or more emitters. Complementary alignment describes the offset of the tip of the one or more emitters with the centers of the one or more apertures as measured in a direction parallel to a surface from which the emitters extend. In some embodiments, the one or more emitters and corresponding one or more apertures of the extractor plate may be aligned within ±5 µm, ±4 µm, ±3 µm, ±2 µm, 1 µm, ±0.5 µm, and/or any other appropriate tolerancing distance. Of course, tolerancing distances both greater than and less than those noted above are also contemplated as the disclosure is not limited in this fashion.

An electrospray device can include a reservoir. The reservoir may be suitable to store or supply a source of ions (e.g., an ionizable liquid, a propellant). In some embodiments, the reservoir is in fluidic communication with one or more capillary pores and provides the source of ions to the one or more emitters via the one or more capillary pores. For example, in FIG. 4, electrospray device 400 includes a reservoir 410 configured to contain a liquid source of ions. The reservoir 410 is in fluidic communication with the one or more capillary pores (e.g., capillary pore 415) and the capillary pores may flow the source of ions from reservoir 410 to the one or more emitters (e.g., emitter 416) via capillary action based on an appropriate combination of the pore size the capillary pores and a corresponding surface energy of the substrate relative to the liquid. While FIG. 4 includes capillary pores within the emitter structure, it should be understood that in some embodiments, the capillary pores may be absent. For example, in FIG. 5, emitter structure 530, which is adjacent to extractor plate 540, does not include capillary pores. Instead, in such an embodiment, a source of ions may be provided to the surface of the emitter structure including the individual emitters using a different delivery method and the surface may be wet by the source of ions such that it is transported to the individual emitters formed thereon.

Figure 4:
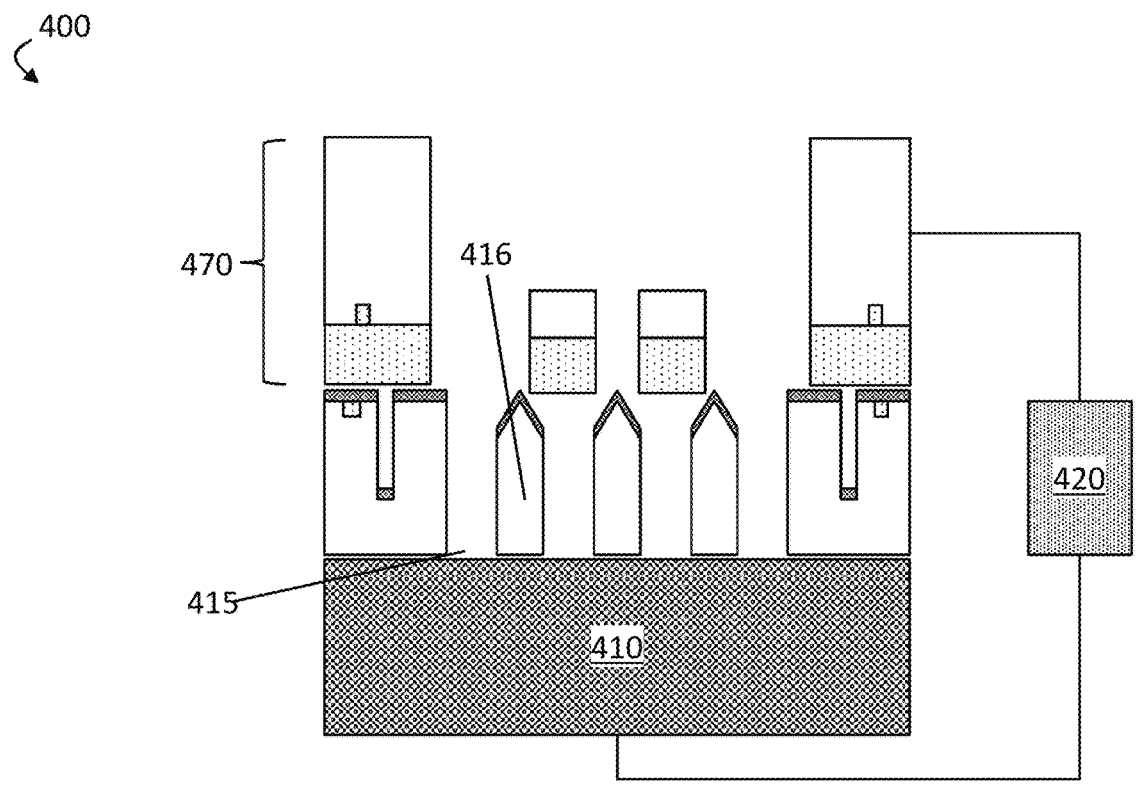
FIG. 4 is a schematic of an electrospray device including an emitter structure, an extractor plate, a reservoir, and a power source, according to some embodiments.
Figure 5:
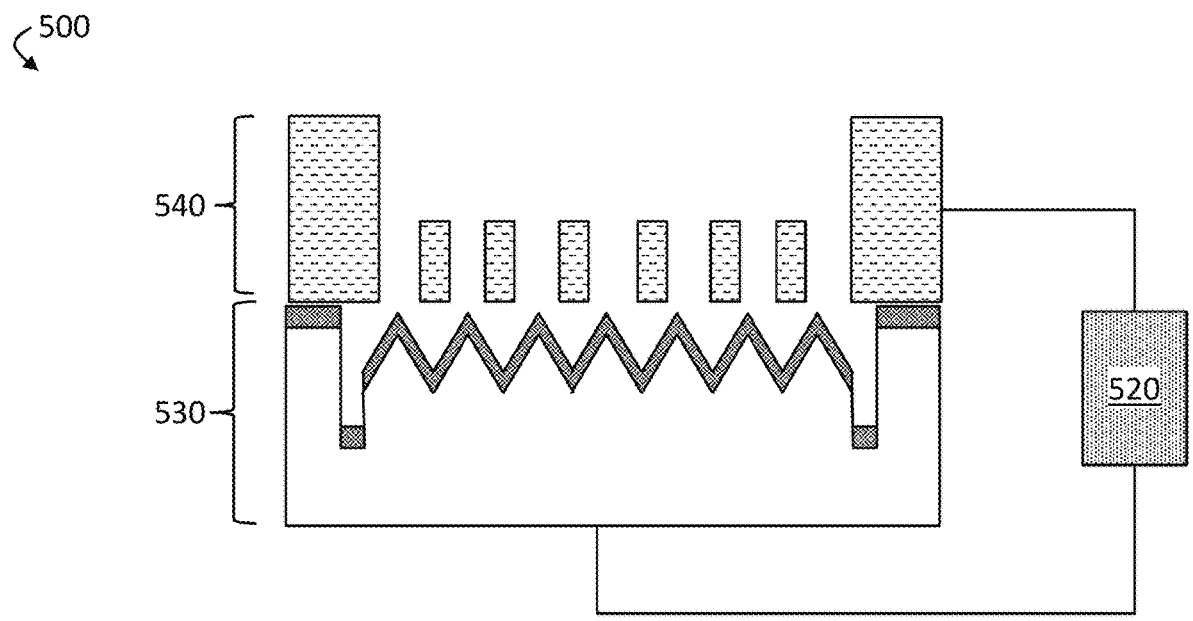
FIG. 5 is a schematic of an electrospray device where the emitter structure does not include one or more capillary pores, according to some embodiments.

The electrospray device may also include a power source. The power source can provide a voltage between the extractor plate and the source of ions or the one or more emitters. That is to say, the power source can hold the extractor and the source of ions (e.g., a conductive liquid) at different potentials. Referring now to FIGS. 4 and 5, a power source 420 and 520, respectively, is included in electrospray devices 400 and 500, respectively. In FIG. 4, power source 420 is in electronic communication with extractor plate 470 and the liquid source of ions. Depending on the embodiment, the power source is in electrical contact with the liquid source of ions via an electrode disposed in the reservoir. Alternatively, in some embodiments, the power source may be directly coupled to the substrate of the extractor structure. In either case, the power source can ionize the source of ions such that the formed ions may be emitted from a tip of the one or more emitters and accelerated towards the extractor plate to provide thrust. FIG. 5 schematically depicts power source 520 in electronic communication with emitter structure 530 and extractor plate 540. In the FIG. 5, the emitter structure does not contain one or more capillary pores. In such an embodiment, the source of ions may be ionized adjacent to the emitter structure and attracted to the extractor plate to provide thrust. It should be noted that other configurations for the power source are possible. In some embodiments, the power source is in electrical communication with the source of ions. In some embodiments, the power source may be connected to a reference electrode.

The electrospray devices and methods of fabricating electrospray devices described herein may be useful for providing propulsion systems to microscale and nanoscale satellites. Devices and methods may be particularly suitable for use with a silicon substrate, which may allow for a fully micro-fabricated satellite. In some embodiments, the emitter structure can include one or more capillary pores, which can advantageously provide for a passively-supplied source of ions to the one or more emitters, which can provide electrospray emission using the solid substrate. The electrospray devices and methods described herein may also have much higher emitter densities when compared to existing devices, owing in part to the micro- and nanofabrication of the electrospray devices described herein. This can improve the propulsion provided by the electrospray device, resulting in enhanced thruster performance compared to certain existing systems. However, other applications outside of micropropulsion are contemplated. For example, electrospray devices described herein may be suitable to use with electrospray ionization in mass spectrometry, which is useful for chemical or biochemical analysis. The electrospray devices may also use a liquid metal as the ion source and provide ion implantation or be used in focused ion beam instruments. Additionally, the electrospray devices may find use in ambient atmospheric charge neutralization or manipulation. The fabrication methods described herein may find use in deposition techniques for nanoscale structures, textile manufacturing, or highly porous drug carriers and drug inhalation. Other applications are possible.

The following examples are intended to illustrate certain embodiments of the present disclosure, but do not exemplify the full scope of the invention.

Example 1

The following example describes the design of an electrospray device that includes an emitter structure and an extractor plate.

Emitter Structure

Figure 7:
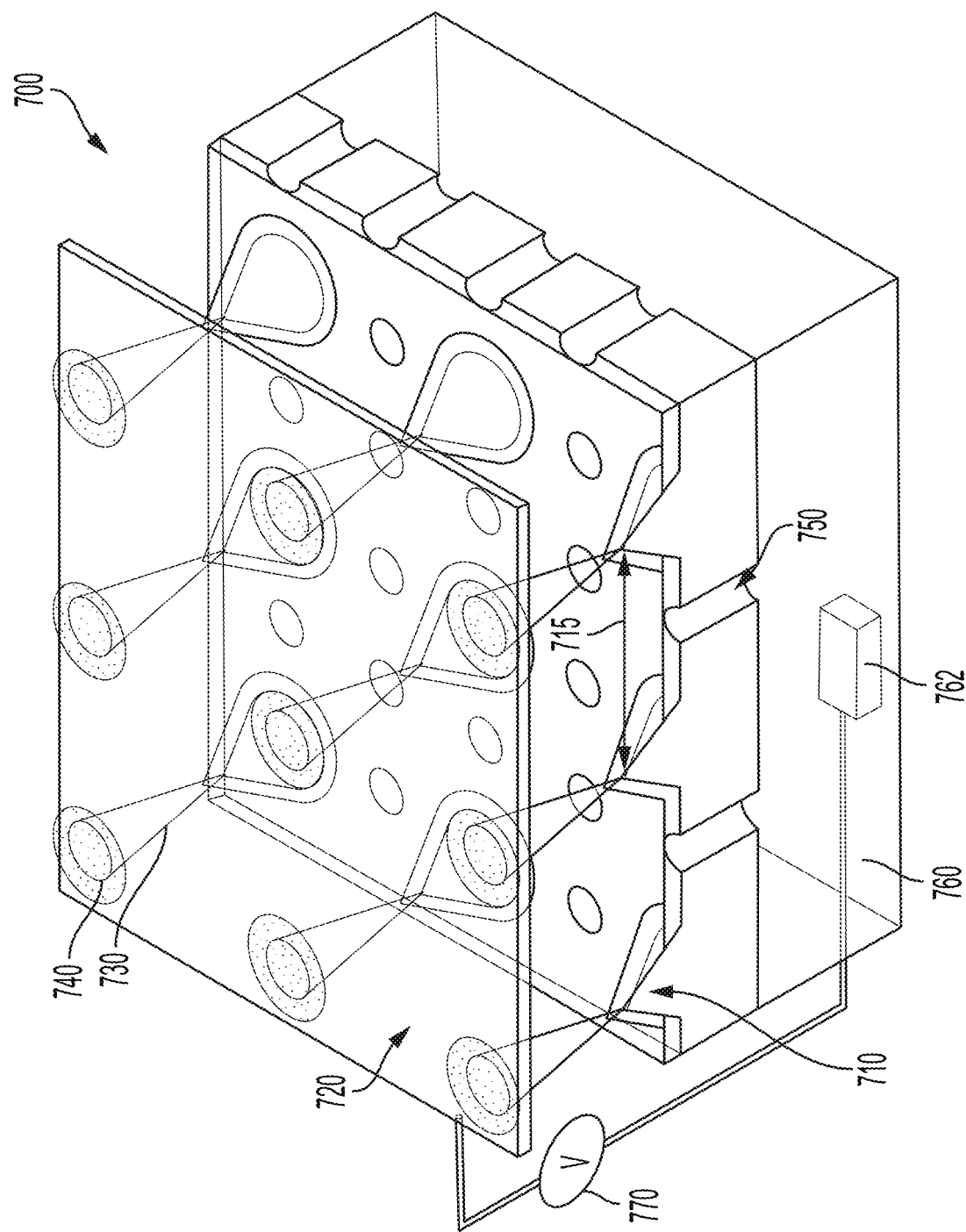
FIG. 7 is a schematic diagram an electrospray device showing the pitch between each emitter, according to one set of embodiments.

The final array architecture combines the passive flow control of an externally-wetted array with propellant supply via capillary transport. A representation of this geometry is shown in FIG. 7. In the figure, electrospray device 700 includes emitters 710 separated by a distance of pitch 715. Electrospray device 700 also includes extractor 720, which attracts ion stream 730 through aperture 740. Electrospray device 700 further includes capillary pores 750, which are in fluidic communication with fuel reservoir 760 and the surface of the solid substrate. Fuel reservoir 760 also includes reference electrode 762 connected to power supply 770, which is also connected to extractor 720. A distal electrode offers substantial mitigation of electrochemical wear, even without voltage alternation.

Figure 8:
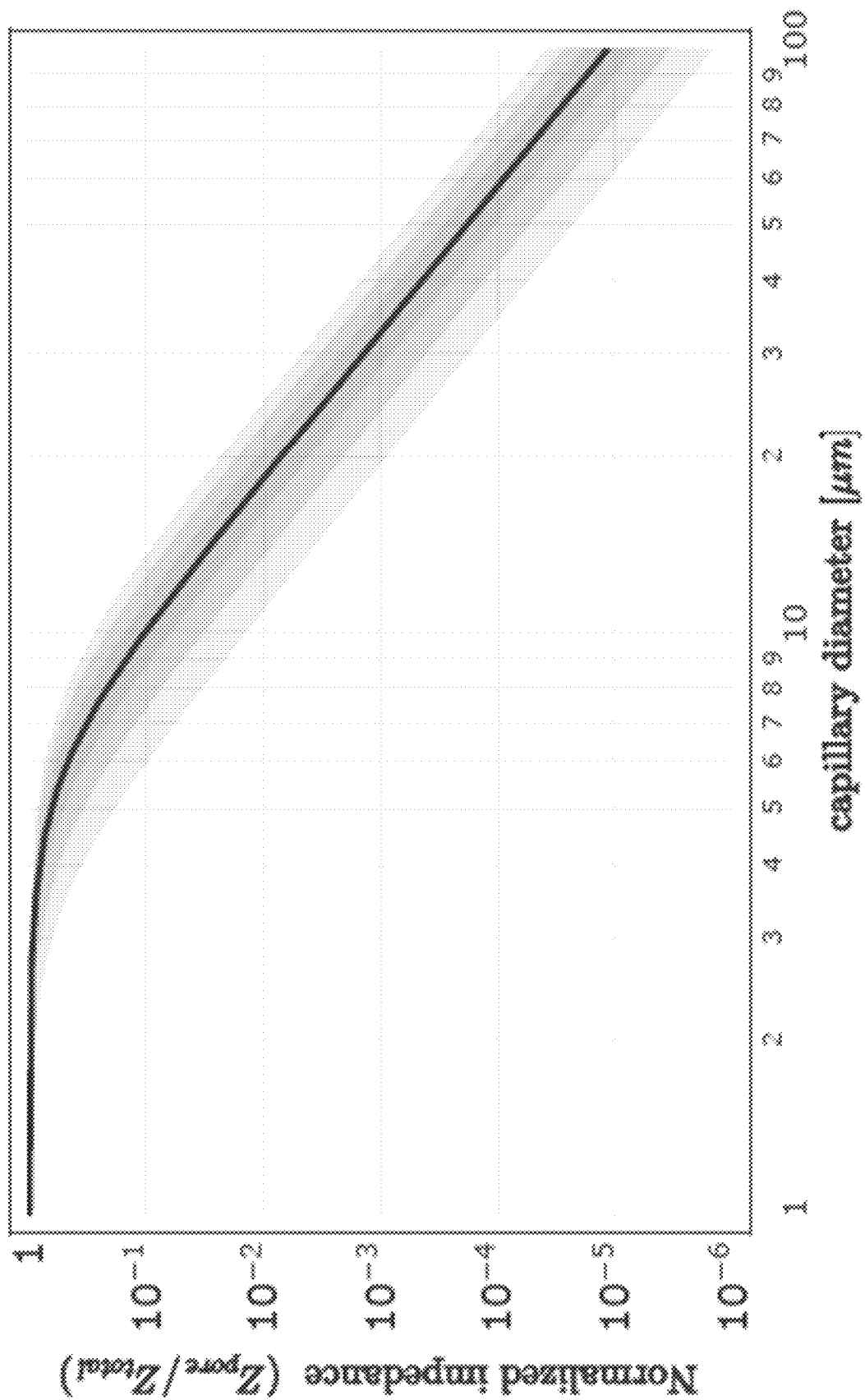
FIG. 8 is a plot of the normalized impendence as a function of capillary pore diameter, according to one set of embodiments.

Without wishing to be bound by theory, for stability and spatial uniformity of emission, the pressure drop over an individual tip should dominate over that of other sections in the propellant's path. Although this is less significant when compare to existing porous designs, it would mitigate the effects of flow disruption in a single capillary. Since the ratio of emitters to capillaries is one to one in this example, this condition can be expressed as $Z_{tip} \gg Z_{pore}$, where Z is the fluidic impedance. Note that this neglects the region between pores and the adjacent emitter base; this distance is small in the design and thus the effect of this assumption is mild. To ensure conformity, capillary diameter is increased to 30 microns (and the associated impedance is therefore more than two orders of magnitude lower than that of the emitter). FIG. 8 shows the relationship between capillary size (diameter) and its proportional effect on total impedance. The shaded bands indicate uncertainty due to inexact knowledge of the surface permeability coefficient.

The relative success of high aspect ratio emitters during testing of the externally wetted geometries led us to include only type D and G tips in this design iteration, where D and G are arbitrary labels that designate higher aspect ratio emitters with sharper tips relative to tips with lower aspect ratios and blunter tips. A slight modification to the tip region ensured that the actual radius of curvature would be closer to the nominal value of 5 microns. To mitigate the large size of the lowest step seen in the certain existing designs, a raised region was created on the array surface. Table 1 summarizes the chosen spatial densities included in this design.

TABLE 1

| Emitter Variant | Pitch Distance (microns) | Number of Emitters | Spatial Density (tips/cm$^2$) |
|---|---|---|---|
| D | — | 1 | 1 |
| G | — | 1 | 1 |
| G | 450 | 810 | 493 |
| G | 127 | 729 | 6,200 |
| G | 127 | 2916 | 6,200 |
| D | 64 | 3025 | 24,414 |

Figure 9A:
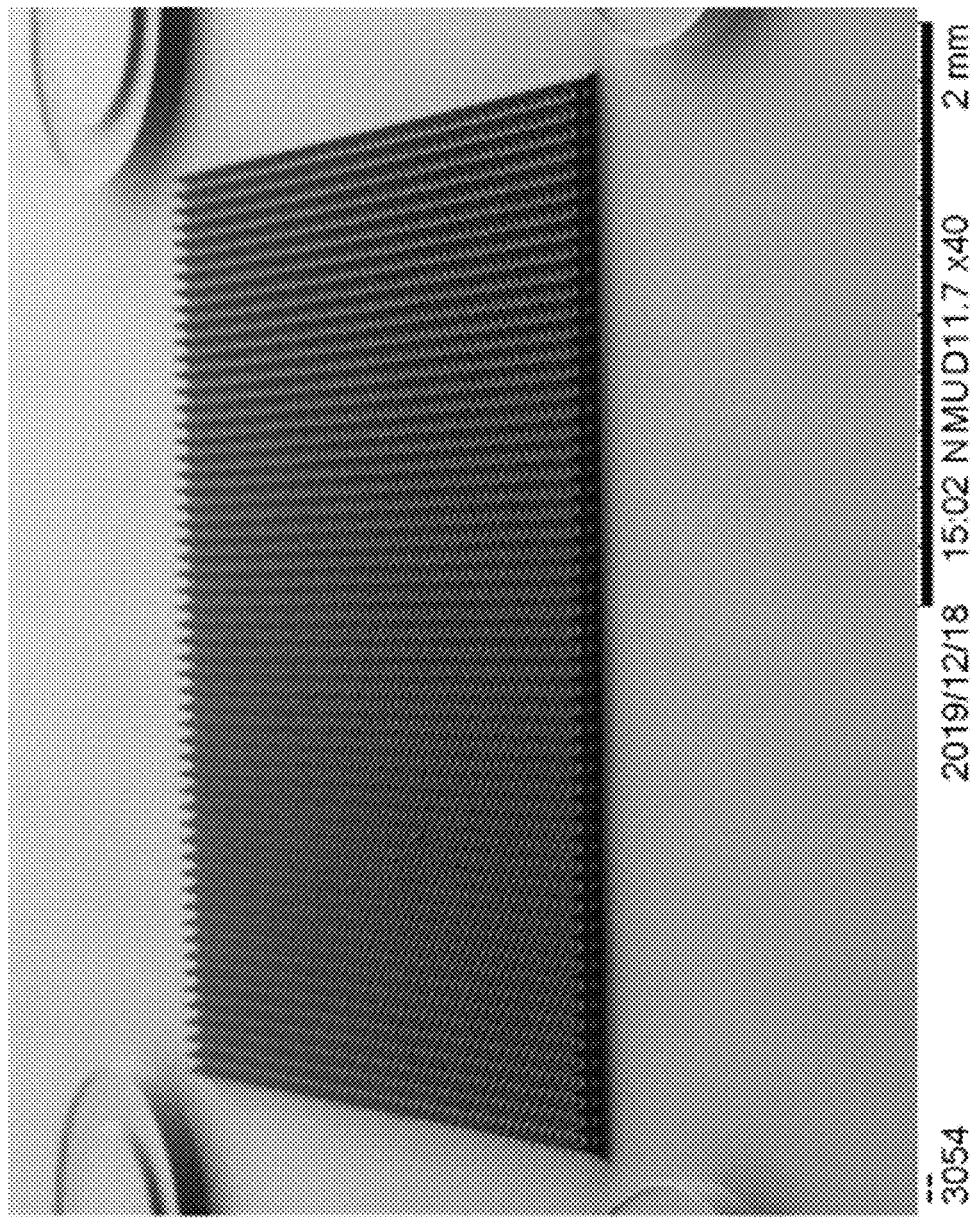
FIG. 9A is a photographic image of an array of emitters, according to certain embodiments.
Figure 9B:
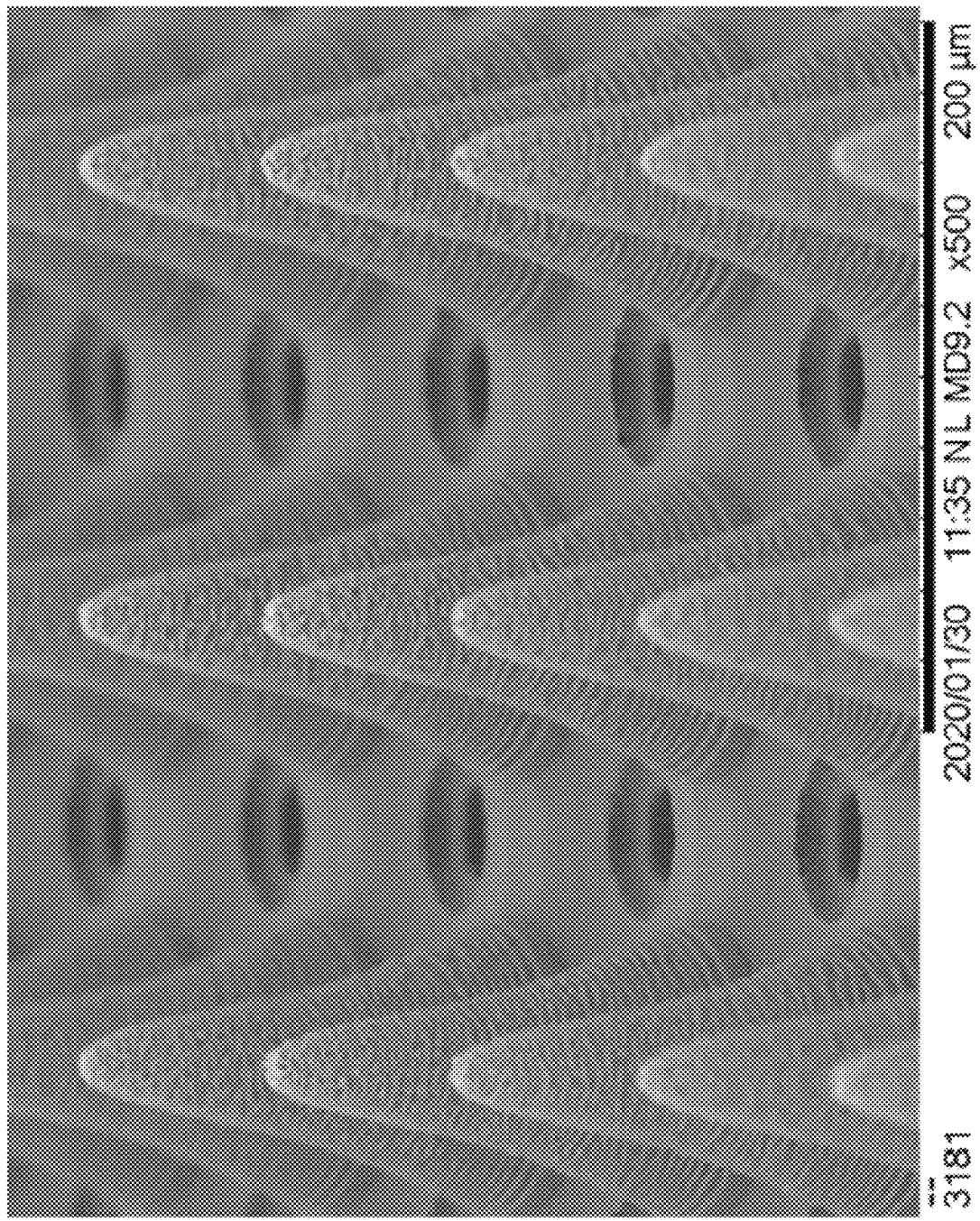
FIG. 9B is an SEM image of an array of emitters and an array of capillary pores within a silicon substrate, according to certain embodiments.
Figure 9C:
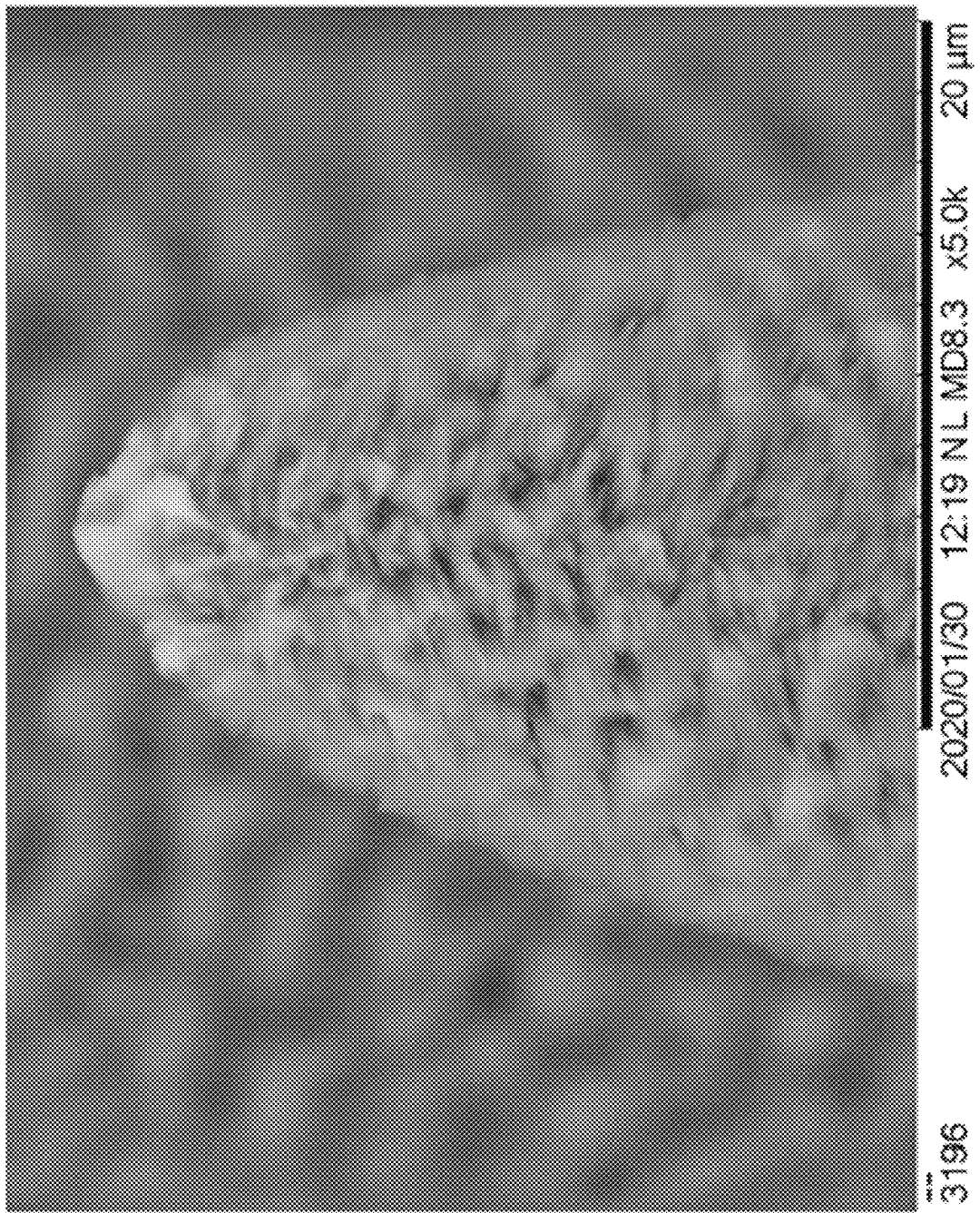
FIG. 9C is an SEM image of an emitter tip fabricated by grayscale lithography to produce a texturized surface, according to certain embodiments.

FIG. 9A-9C display architectures used in this example at increasing magnifications. FIG. 9A show the full type D array corresponding to the final entry of Table 1. FIG. 9B gives a closer view of a high-density type G array. At this magnification, the capillaries and emitter profile are visible. FIG. 9C shows the tip radius of curvature of a type G emitter. Note that its sharpness can be adjusted within a range by small changes in the grayscale etching process. The emitters of FIGS. 9A-9C have black silicon surface texture resulting from a MACE process.

Extractor Design

Design of the extractor electrode used a few initial assumptions. Beam half angle was taken to be 20. To account for the possibility of off axis emission, an additional 5° were added. Initial optical alignment attempts indicate a tolerance on the order of single microns; thus a horizontal error of 5 microns is assumed. The current design seeks to minimize the extractor gap, with an estimated 5 micron vertical tolerance deemed acceptable. For a given aperture radius the following equation is used:

$$h_{max} = -5 + \frac{r+5}{\tan(\theta_b + 5°)}$$

The resulting thickness parameter was used to create a CAD model of the extractor. Validation of this geometry was performed with a COMSOL Multiphysics® static stress analysis. For deflection calculations, electrostatic pressure was assumed to be uniformly distributed evenly throughout the emission region (i.e., the array geometry is neglected). Despite this parallel plate assumption, the even distribution of emitters and application of an equivalent total field should provide sufficient accuracy in cases of limited deflection; a significant sag would cause noticeable increase to the pressure magnitude. For this reason, each of the three critical conditions were examined with allowable deflection limited to one micron. The type D array exceeded this threshold even at the maximum thickness. After support posts were moved closer to the emission region deflection was decreased to an acceptable value.

TABLE 2

| Emitter Type | Pitch Distance (microns) | Aperture Diameter (microns) | Maximum Distance (microns) | Minimum Deflection (microns) |
|---|---|---|---|---|
| D | 64 | 38 | 25 | 1.164 |
| G | 127 | 90 | 80.7 | 0.106 |
| G | 450 | 90 | 80.7 | 0.032 |

Figure 10:
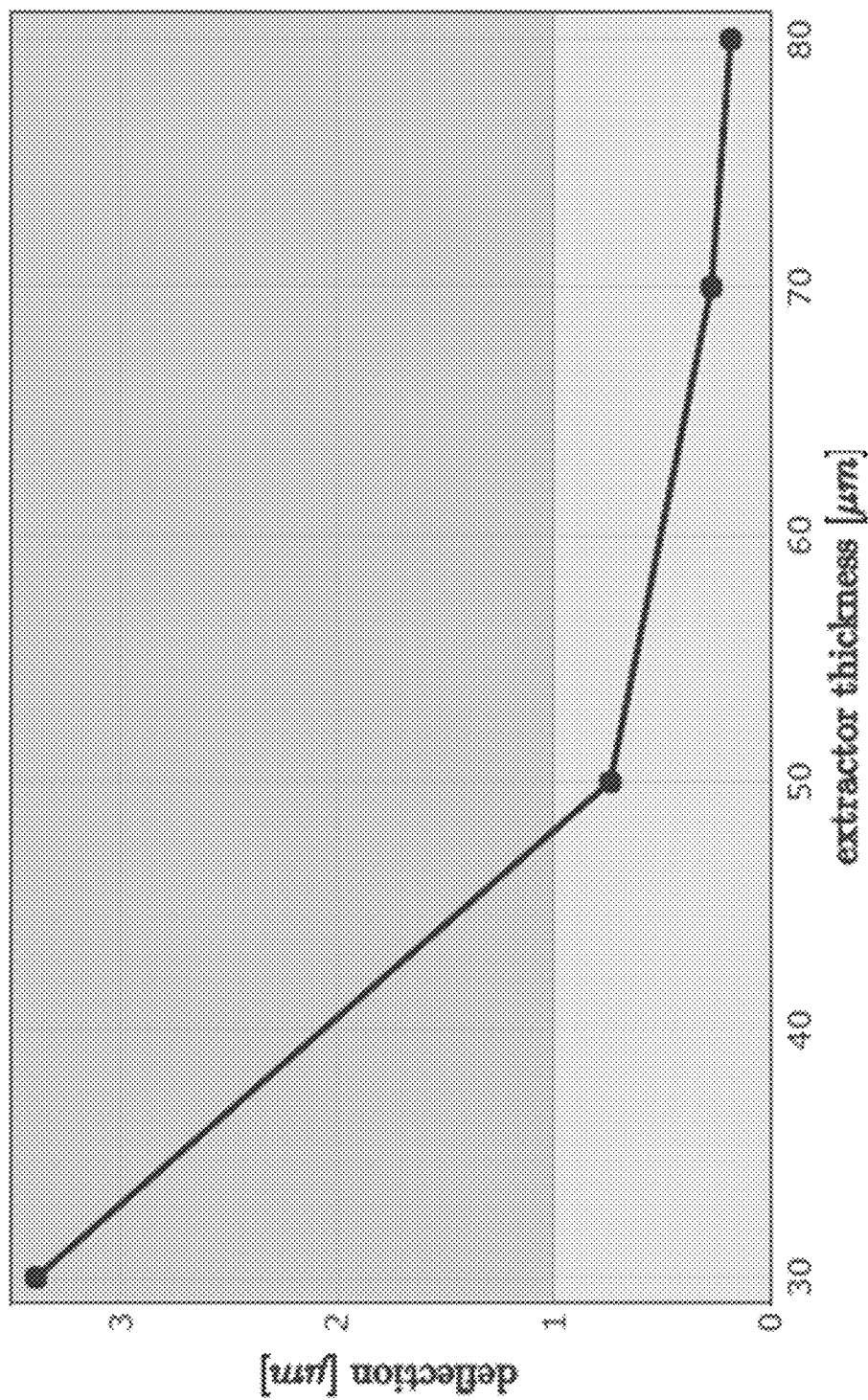
FIG. 10 is a graph of simulated deflection a tight pitch array versus extractor thickness, according to one set of embodiments.

For the more sparse type G arrays, initial deflection was well below the critical value. To minimize beam interception risk and ease alignment constraints, the array thickness was further reduced. FIG. 10 shows simulated deflection as a function of extractor thickness for the 127-micron pitch type G array. The bottom shaded region illustrates the range of acceptable performance. As a result of this analysis, a 50-micron extractor thickness was chosen for all type G arrays. Predicted deflection of the 127- and 450-micron cases is 0.181 and 0.737 microns respectively. The extractor electrodes themselves are etched silicon wafers with a thin oxide coating in this example.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the invention may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of." or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second." "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having." "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrospray device, comprising:
   a solid substrate;
   one or more emitters formed on a first surface of the solid substrate; and
   one or more capillary pores formed in the solid substrate, wherein the one or more capillary pores are configured to transport a source of ions from a reservoir to the first surface through the substrate,
   wherein the first surface is a uniformly and/or conformally texturized with a plurality of micropillars that extend from the first surface to facilitate wetting of the first surface and thus facilitate transport of the source of ions from the one or more capillary pores to the one or more emitters via the first surface.

2. The electrospray device of claim 1, wherein the one or more capillary pores extend through the solid substrate from the first surface to a second opposing surface of the solid substrate.

3. The electrospray device of claim 1, further comprising an extractor plate disposed downstream from the solid substrate.

4. The electrospray device of claim 1, wherein a density of the one or more emitters on the solid substrate is at least $62,500/cm^2$.

5. The electrospray device of claim 1, wherein a ratio of the one or more capillary pores capillary pores to one or more emitters is at least 1:1.

6. The electrospray device of claim 1, further comprising an extractor plate proximate to the first surface of the solid substrate.

7. The electrospray device of claim 1, wherein each of the one or more emitters comprises a plurality of micropillars formed on a respective surface of each of the one or more emitters.

8. The electrospray device of claim 7, wherein the plurality of micropillars has an average length of less than or equal to 5 microns.

9. The electrospray device of claim 1, wherein a pitch between each of the one or more emitters is less than or equal to 65 microns.

10. The electrospray device of claim 1, wherein the solid substrate comprises silicon, black silicon, germanium, and/or silicon carbide.

11. The electrospray device of claim 1, wherein a respective surface of each of the one or more emitters is uniformly and/or conformally texturized with a step-like texture.

12. The electrospray device of claim 11, wherein the step-like texture comprises a gradient in a thickness of texturization.

13. The electrospray device of claim 1, wherein the plurality of micropillars have an average length of less than or equal to 5 microns.

14. An electrospray device, comprising:
    a solid substrate; and
    one or more emitters formed on a first surface of the solid substrate, wherein a density of the one or more emitters on the solid substrate is at least $62,500/cm7$,
    wherein the first surface is a uniformly and/or conformally texturized with a plurality of micropillars that that extend from the first surface to facilitate wetting of the first surface and thus facilitate transport of a source of ions along the first surface to the one or more emitters.

15. The electrospray device of claim 14, further comprising one or more capillary pores in the solid substrate and wherein the one or more emitters is in fluidic communication with the one or more capillary pores.

16. The electrospray device of claim 15, further comprising a reservoir and wherein the one or more capillary pores are configured to transport the source of ions disposed in the reservoir to the one or more emitters.

17. The electrospray device of claim 15, wherein a ratio of the one or more capillary pores to the one or more emitters is at least 1:1.

18. The electrospray device of claim 15, wherein the one or more capillary pores extend through the solid substrate from the first surface to a second opposing surface of the solid substrate.

19. The electrospray device of claim 14, further comprising an extractor plate disposed downstream from the solid substrate.

20. The electrospray device of claim 14, further comprising an extractor plate proximate to the first surface of the solid substrate.

21. The electrospray device of claim 14, wherein a respective surface of each of the one or more emitters are also texturized by the plurality of micropillars.

22. The electrospray device of claim 21, wherein the plurality of micropillars has an average length of less than or equal to 5 microns.

23. The electrospray device of claim 14, wherein a pitch between each of the one or more emitters is less than or equal to 65 microns.

24. The electrospray device of claim 14, wherein the solid substrate comprises silicon, black silicon, germanium, and/or silicon carbide.

25. The electrospray device of claim 14, wherein a respective surface of each of the one or more emitters is uniformly and/or conformally texturized with a step-like texture.

26. The electrospray device of claim 25, wherein the step-like texture comprises a gradient in a thickness of texturization.

* * * * *

UNITED STATES PATENT AND TRADEMARK OFFICE
CERTIFICATE OF CORRECTION

PATENT NO. : 11,708,182 B2
APPLICATION NO. : 17/007890
DATED : July 25, 2023
INVENTOR(S) : Melissa Alyson Smith et al.

It is certified that error appears in the above-identified patent and that said Letters Patent is hereby corrected as shown below:

In the Claims

Column 20, Claim 5, Line 30:
"...one or more capillary pores capillary pores..."
Should read:
--...one or more capillary pores...--

Column 20, Claim 14, Line 63:
"...micropillars that that extend..."
Should read:
--...micropillars that extend...--

Signed and Sealed this
Twenty-sixth Day of March, 2024

*Katherine Kelly Vidal*

Katherine Kelly Vidal
*Director of the United States Patent and Trademark Office*